United States Patent
Mao et al.

(10) Patent No.: US 9,432,426 B2
(45) Date of Patent: Aug. 30, 2016

(54) DETERMINING AVAILABLE MEDIA DATA FOR NETWORK STREAMING

(71) Applicant: QUALCOMM Incorporated, San Diego, CA (US)

(72) Inventors: Yinian Mao, San Diego, CA (US); Fatih Ulupinar, San Diego, CA (US); Donald W. Gillies, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 14/041,724

(22) Filed: Sep. 30, 2013

(65) Prior Publication Data

US 2014/0222962 A1 Aug. 7, 2014

Related U.S. Application Data

(60) Provisional application No. 61/760,382, filed on Feb. 4, 2013.

(51) Int. Cl.

| | |
|---|---|
| G06F 15/16 | (2006.01) |
| H04L 29/06 | (2006.01) |
| H04N 21/43 | (2011.01) |
| H04N 21/61 | (2011.01) |
| H04N 21/845 | (2011.01) |
| H04L 27/00 | (2006.01) |
| H04L 29/08 | (2006.01) |

(52) U.S. Cl.
CPC ........... *H04L 65/60* (2013.01); *H04L 27/0012* (2013.01); *H04L 65/403* (2013.01); *H04L 65/4076* (2013.01); *H04L 65/4084* (2013.01); *H04L 65/602* (2013.01); *H04L 65/608* (2013.01); *H04L 67/02* (2013.01); *H04N 21/4305* (2013.01); *H04N 21/6125* (2013.01); *H04N 21/8456* (2013.01)

(58) Field of Classification Search
CPC .... H04N 21/43; H04N 21/61; H04L 65/608; H04L 65/105
See application file for complete search history.

(56) References Cited

U.S. PATENT DOCUMENTS

| | | | |
|---|---|---|---|
| 7,363,361 B2 | 4/2008 | Tewari et al. | |
| 7,720,983 B2 | 5/2010 | Klemets et al. | |

(Continued)

FOREIGN PATENT DOCUMENTS

WO  2011038013  3/2011

OTHER PUBLICATIONS

3GPP Draft; Draft-23009-1-COR1, 3rd Generation Partnership Project (3GPP), Mobile Competence Centre; 650, Route Des Lucioles; F-06921 Sophia-Antipolis Cedex; France, Jan. 30, 2013, XP050687567, 100 pp.

(Continued)

*Primary Examiner* — Yves Dalencourt
(74) *Attorney, Agent, or Firm* — Shumaker & Sieffert, P.A.

(57) ABSTRACT

A client device includes one or more processors configured to send a plurality of probe requests for segments of media data to a server device, wherein the server device provides the media data using a live streaming service, analyze responses to the plurality of probe requests to determine a left edge and a right edge of a segment availability window, and send a request for a segment within the segment availability window based on the determined left edge and the determined right edge of the segment availability window, in accordance with the live streaming service.

54 Claims, 11 Drawing Sheets

(56) References Cited

U.S. PATENT DOCUMENTS

| | | | |
|---|---|---|---|
| 2010/0049863 A1* | 2/2010 | Heuer | H04N 21/23617 709/231 |
| 2011/0099594 A1 | 4/2011 | Chen et al. | |
| 2012/0259946 A1 | 10/2012 | Stockhammer et al. | |
| 2013/0060956 A1 | 3/2013 | Nagaraj et al. | |
| 2014/0019587 A1* | 1/2014 | Giladi | H04L 29/06476 709/217 |

OTHER PUBLICATIONS

3GPP TR 25.938: "3rd Generation Partnership Project; Technical Specification Group Services and System Aspects; Packet-Switched Streaming Service (PSS) Improved Support for Dynamic Adaptive Streaming over HTTP in 3GPP," Version 0.4.0. Release 11, 3GPP Draft; TR26.938-040-IS-DASH-CL, 3rd Generation Partnership Project (3GPP), Feb. 1, 2013, XP050687698, 37 pp.

International Search Report and Written Opinion—PCT/US2013/078471—ISA/EPO—Apr. 17, 2014, 14 pp.

ISO/IEC 23009-1: "Information technology—Dynamic adaptive streaming over HTTP (DASH)—Part 1: Media presentation description and segment formats," (DASH)—Part 1: Description of the presentation and delivery of media formats, ISO/IEC 23009-1 International Standard, First Edition, Apr. 1, 2012, XP002712145, 132 pp.

Nguyen, et al., "DASH Evaluation Experiment #8, Clock Drift Control", MPEG Meeting; Oct. 11, 2010-Oct. 15, 2010; Guangzhou; (Motion Picture Expert Group or ISO/IEC JTC1/SC29/WG11), No. M18011, XP030046601, 14 pp.

Pyle, et al., "DASH: Clarifications and Improvements on Segment Timeline", MPEG Meeting; Jul. 18, 2011-Jul. 22, 2011; Torino; (Motion Picture Expert Group or ISO/IEC JTC1/SC29/WG11), No. m20360, XP030048924, 18 pp.

Qualcomm Incorporated: "General Corrections to DASH", 3GPP Draft; S4-130040, 3rd Generation Partnership Project (3GPP), Mobile Competence Centre; 650, Route Des Lucioles; F-06921 Sophia-Antipolis Cedex; Feb. 1, 2013, XP050687665, pp. 1-42.

Qualcomm Incorporated: "On DASH Live Conformance software", MPEG Meeting; Jan. 21, 2013-Jan. 25, 2013; Geneva; (Motion Picture Expert Group or ISO/IEC JTC1/SC29/WG11), No. m28190, 6 pp., XP030056737.

Stockhammer, et al., "Low-Latency Live Streaming: Extensions for accurate timing support", MPEG Meeting; Jan. 1, 2013-Jan. 25, 2013; Geneva; (Motion Picture Expert Group or ISO/IEC JTC1/SC29/WG11), No. m28196, 7 pp., XP030056743.

Yue, "Comments on SDCOR of 23009-1", MPEG Meeting; Jan. 21, 2013-Jan. 25, 2013; Geneva; (Motion Picture Expert Group or ISO/IEC JTC1/SC29/WG11), No. m28252, 3 pp., XP030056799.

Response to Written Opinion dated Apr. 17, 2014, from International Application No. PCT/US2013/078471, filed on Dec. 4, 2014, 3 pp.

Second Written Opinion from International Application No. PCT/US2013/078471, dated Feb. 2, 2015, 11 pp.

Response to Second Written Opinion dated Feb. 2, 2015, from International Application No. PCT/US2013/078471, filed on Apr. 2, 2015, 28 pp.

International Preliminary Report on Patentability from International Application No. PCT/US2013/078471, dated May 6, 2015, 13 pp.

* cited by examiner

DETERMINING AVAILABLE MEDIA DATA FOR NETWORK STREAMING

This application claims the benefit of U.S. Provisional Application Ser. No. 61/760,382, filed Feb. 4, 2013, the entire contents of which are hereby incorporated by reference.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for determining available Segments of a Representation of media content during live network streaming of the Representation. A client device may send a plurality of probe requests for a sequence of Segments of the Representation, such as HTTP HEAD requests, and analyze the responses to these requests to determine a boundary between available Segments and unavailable Segments. This boundary may be referred to as an "edge" of a segment availability window. In some examples, the client device may send this sequence of probe requests in response to a number of responses including HTTP 404 errors to previous requests. The HTTP errors may indicate that a clock of the client device has drifted relative to an advertised availability of the Segments (e.g., relative to a clock of a server device). The probe requests may permit a client device to determine whether one or more segments of media data are available for retrieval.

In one example, a method of retrieving media data includes sending a plurality of probe requests for segments of media data to a server device, wherein the server device provides the media data using a live streaming service, analyzing responses to the plurality of probe requests to determine a left edge and a right edge of a segment availability window, and sending a request for a segment within the segment availability window based on the determined left edge and the determined right edge of the segment availability window, in accordance with the live streaming service.

In another example, a device for retrieving media data includes one or more processors configured to send a plurality of probe requests for segments of media data to a server device, wherein the server device provides the media data using a live streaming service, analyze responses to the plurality of probe requests to determine a left edge and a right edge of a segment availability window, and send a request for a segment within the segment availability window based on the determined left edge and the determined right edge of the segment availability window, in accordance with the live streaming service.

In another example, a device for retrieving media data includes means for sending a plurality of probe requests for segments of media data to a server device, wherein the server device provides the media data using a live streaming service, means for analyzing responses to the plurality of probe requests to determine a left edge and a right edge of a segment availability window, and means for sending a request for a segment within the segment availability window based on the determined left edge and the determined right edge of the segment availability window, in accordance with the live streaming service.

In another example, a computer-readable storage medium has stored thereon instructions that, when executed, cause a processor to send a plurality of probe requests for segments of media data to a server device, wherein the server device provides the media data using a live streaming service, analyze responses to the plurality of probe requests to determine a left edge and a right edge of a segment availability window, and send a request for a segment within the segment availability window based on the determined left edge and the determined right edge of the segment availability window, in accordance with the live streaming service.

The details of one or more examples are set forth in the accompanying drawings and the description below. Other features, objects, and advantages will be apparent from the description and drawings, and from the claims.

DETAILED DESCRIPTION

Figure 1:
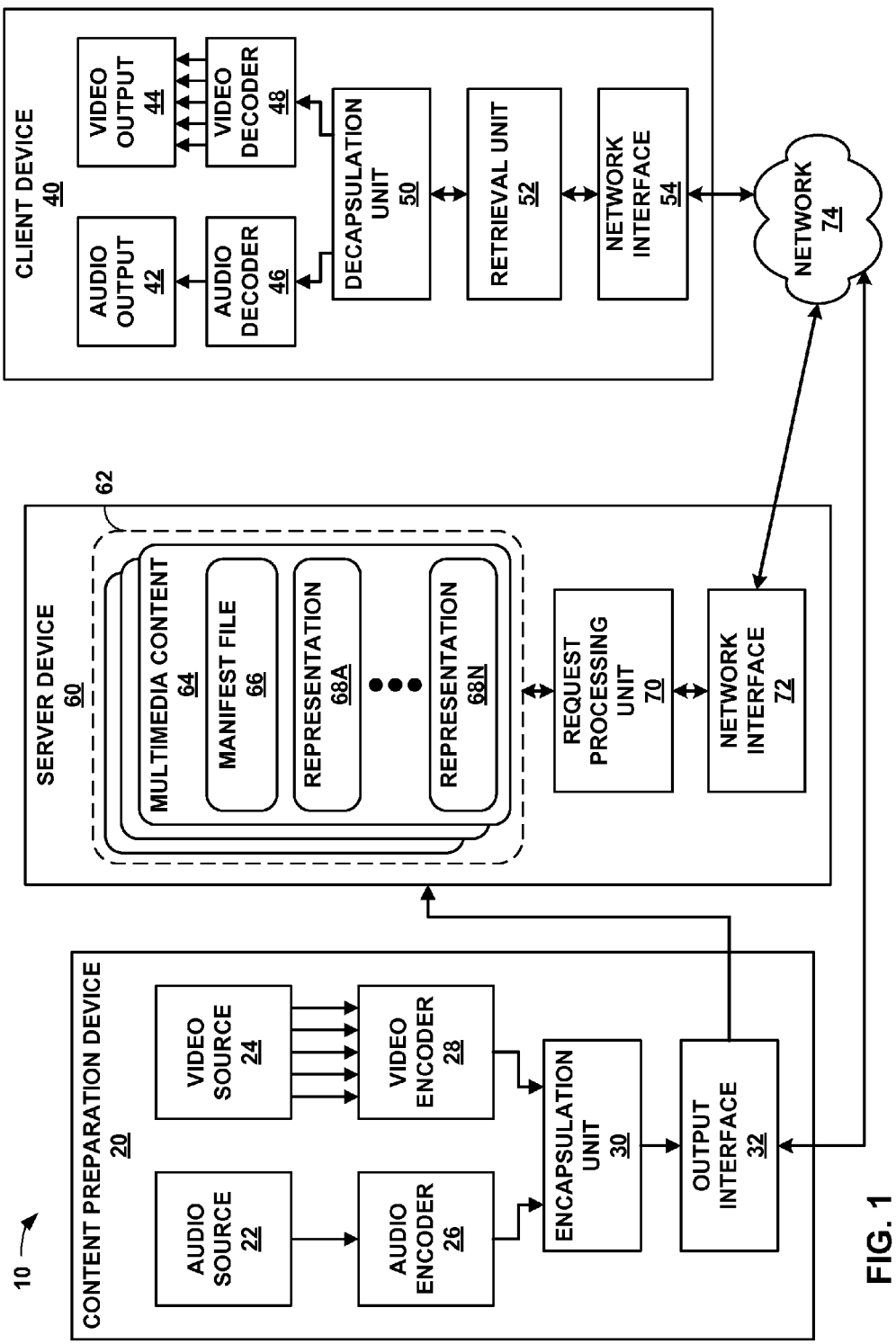
FIG. 1 is a block diagram illustrating an example system that implements techniques for streaming media data over a network.

In general, this disclosure describes techniques for determining available media data in an environment for streaming the media data, such as a dynamic adaptive streaming over HTTP (DASH) environment. These techniques may be used to support HTTP Live Streaming (HLS) or other live streaming services. Although generally discussed with respect to DASH and HLS, the techniques of this disclosure may be applicable to other network streaming protocols. DASH is specified in ISO/IEC 23009-1:2012, "Information technology—Dynamic adaptive streaming over HTTP (DASH)—Part 1: Media presentation description and segment formats," Apr. 1, 2012, available at http://standards.iso.org/ittf/PubliclyAvailableStandards/c057623_ISO_IEC_23009-1_2012.zip.

The techniques of this disclosure generally relate to determining whether media data is available for retrieval. In some instances, media data may be advertised as being available at a certain time, but the clock of a client device may not be synchronized with a clock advertising the time at which the media data is made available. For instance, the clock of the client device may have drifted ahead of or behind a clock used to indicate when the media data is available (e.g., a clock of a server device or a clock of a content preparation entity).

The client device may be configured to implement the techniques of this disclosure to determine whether the clock of the client device has drifted relative to a clock time representative of when the media data is available, as well as to determine what media data is currently available. In accordance with the techniques of this disclosure, the client device may be configured to send a plurality of requests to a server device, where each of the requests corresponds to a respective segment in a sequence of segments of the media data. The requests may be formulated to retrieve only a small amount of data, or no data, for the segments. For example, the requests may comprise HTTP HEAD requests, or partial GET requests for relatively small portions of the corresponding segments (e.g., 100 bytes). That is, the requests may comprise requests for an amount of data of a segment that is substantially smaller than the full amount of data for the segment. The server device may then respond to these requests, either with the requested data or with an HTTP 404 error. By analyzing the responses, the client device may determine which of the sequence of segments are available and which of the sequence of segments are unavailable.

By constructing the plurality of requests based on the client device's internal clock and an advertised time of availability for the segments, the client device may determine whether the client device's internal clock has drifted relative to the server device's internal clock. In this manner, the client device can request segments as the segments become available, based on the drift between the client device's clock and the server device's clock.

In other words, in live streaming (e.g., according to DASH), a client device and a server device may be approximately synchronized. However, there can be a time delta of plus or minus a few seconds between a clock of the client device and a clock of the server device. This may lead to the client being unable to retrieve Segments. Although the time shift buffer depth (TSBD) may help, this help may only be provided under limited conditions. There is also currently no millisecond-accurate time synchronization protocol between the client device and the server device. Such a protocol is difficult to achieve, and may be out of the scope for DASH.

One practical solution offered by the techniques of this disclosure involves the client device being able to estimate the time delta only based on the client device's behavior, and then taking the time delta into consideration with making subsequent requests. Such an algorithm can be triggered when the initial segment requests fail, or whenever a new live streaming session starts. The client device can do so by searching for edges of the segment availability window (e.g., left edge or right edge of the TSBD, also referred to as the trailing edge and the leading edge of the TSBD, respectively), using regular segment requests, as described in greater detail below.

In HTTP streaming, frequently used operations include HEAD. GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Each representation may also include one or more media components, where each media component may correspond to an encoded version of one individual media type, such as audio, video, or timed text (e.g., for closed captioning). Media components may be time-continuous across boundaries of consecutive media segments within one representation.

In general, a DASH client device may access and download an MPD from a DASH server device. That is, the DASH client device may retrieve the MPD for use in initiating a live session. Based on this MPD, and for each selected Representation, DASH client device may make several decisions, including determining what is the latest segment that is available on the server device, determining the segment availability start time of the next segment and possibly future segments, determining when to start playout of the segment and from which timeline in the segment, and determining when to get/fetch a new MPD. Once the service is played out, the client device may keep track of drift between the live service and its own playout, which needs to be detected and compensated.

HTTP Live Streaming (HLS) attempts to solve these issues as follows. For each segment that is made available, the server device publishes a new MPD. The client device, after joining the service, retrieves the latest MPD, analyzes the playlist, and then can access the newest segment. The client device then starts playing out the segment and is configured under the expectation that, when playing the segment from the beginning, it can continually access the next segment in time. Before fetching a new segment (or requiring to fetch one), the client device fetches a new MPD providing the location of where to get the latest segment.

SmoothStreaming attempts to solve these issues as follows. For each segment that is made available, the server device publishes a new MPD. The client, after joining the service, retrieves the latest MPD, analyzes the latest segment that is available by getting the "@r" attribute of the SegmentTimeLine of the latest S element. This provides the information indicating where to get the latest segment. The client device then starts playing out the segment and is configured under the expectation that, when playing the segment from the beginning, it can continually access the next segment in time as long as the next request is not before the time resulting from adding the segment duration to the time of the last request. The client therefore continues to construct Segments based on the latest SegmentTimeline. S element without fetching a new MPD until it gets an inband signal indicating that the current MPD is no longer usable. At this point in time (that is, in response to the signal that the current MPD is no longer usable), the client device requests a new MPD.

MPEG-DASH uses a wall-clock time documented in the MPD, which sets-up the live Media Presentation. MPEG-DASH assumes that the MPD is generated such that the MPD generation process does have access to an accurate clock. This enables client devices that are synchronized to the wall-clock time by any means to operate closer to the live edge (also referred to as the leading edge). Specifically, the following information is available in the MPD when using a number-template based Representations and using the @duration attribute:

MPD@availabilityStartTime: the start time is the anchor for the MPD in wall-clock time. The value is denoted as AST.

MPD@minimumUpdatePeriod: the minimum update period of the MPD. The value is denoted as MUP.

MPD@suggestedPresentationDelay: suggested presentation delay as delta to segment availability start time. The value is denoted as SPD.

MPD@minBufferTime: minimum buffer time, used in conjunction with the @bandwidth attribute of each Representation. The value is denoted as MBT.

MPD@timeShiftBufferDepth: time shift buffer depth of the media presentation. The value is denoted as TSB.

Period@start: the start time of the Period relative to the MPD availability start time. The value is denoted as PS.

SegmentTemplate@startNumber: number of the first segment in the Period. The value is denoted as SSN.

SegmentTemplate@duration: the duration of a segment in units of a time. The value divided by the value of @timescale is denoted as d.

It is assumed that the client device did fetch the MPD at fetch time FT.

Assuming now that the wall-clock time at the client is denoted at WT, then the client device can derive the following information:

the address of the latest segment that is available on server which requires the latest segment number denoted as LSN the segment availability start time of the next segment with number LSN+1 and any other segment SN, denoted as SAST(SN). Note that SN starts with 1.

The media presentation time within the segment that synchronizes closest to the live edge, MPTL.

The media presentation time within the segment that synchronizes to other clients, MPTS.

The time when to fetch a new MPD based on the current presentation time.

An example of the techniques of MPEG-DASH is explained below. In this example, let the MPD include the following information:

```
<MPD availabilityStartTime="2011-12-25T12:30:00"
minimumUpdatePeriod="30s" suggestedPresentationDelay="15s"
minBufferTime="5s"/>
<BaseURL>http://www.example.com/</BaseURL>
<Period start="PT0S"/>
...
</Period>
<Period start="PT0.10S>
...
    <SegmentTemplate timescale="48000" startNumber="22"
    presentationTimeOffset= "2016000" duration="96000"
    initialization="audio/fr/init.mp4a" media= "audio/fr/
    $Number$.mp4"/>
...
</Period>
```

Assume further that a client device fetches the MPD and the wall-clock time is NTP="2011-12-25T12:30:27." This value is denoted as FT, in this example.

The client device then derives the latest segment number. That is, the client device obtains the latest Period as the Period for which AST+PS<=NTP. If NTP>=AST+PS+d; then at least one segment within this Period is available, and the client device derives the latest segment number (LSN) available on the client as:

$$LSN=\text{floor}(NTP-(AST+PS)-d)/d)+SSN=\text{floor}(15/2)+22=29 \quad (1)$$

The resulting URL is therefore, in this example, derived as http://www.example.com/audio/fr/29.mp4.

The client device then derives the segment availability start time (SAST) for a segment with number SN as:

$$SAST(SN)=AST+PST+(SN-SSN+1)*d \quad (2)$$

This means that, in this example, for SN=30, the SAST (SN=30)=2011-12-25T 2:30:28.

The client device then schedules the playout based on the available information in the MPD. The client device determines the media presentation time in the Period for each Representation as presentation time value in the media segments minus the value of the @presentationTimeOffset, if present, for each Representation. Each segment with segment number SN includes an earliest presentation time, denoted by EPT(SN).

By offering an MPD, in MPEG-DASH, it is guaranteed that:
1. Each segment in this Period is available prior to its earliest presentation time, i.e., for all SN, EPT(SN) >=SAST(SN)−(AST+PST).
2. If each segment with segment number SN is delivered starting at SAST(SN) over a constant bitrate channel with bitrate equal to value of the @bandwidth attribute, then each presentation time PT is available at the client latest at time PT+(AST+PST)+MBT.
3. A recommended playout-time MPTS (PT) for a presentation time when operating in sync with other clients is MPTS(PT)=(AST+PST)+PT+SPD.
4. Each segment in this Period is available at least until SAST(SN)+TSB+d.

Using this information, the client device can start scheduling playout, taking into account the information in the MPD as well the download speed. A suitable playout time is POT(PT)=MPTS(PT), if the attribute @suggestedPresentationDelay is present. If @suggestedPresentationDelay is not present, then a suitable playout time takes into account the first, second, and fourth constraints above, i.e., the segment availability times at the server as well as the bitrate variability of the media stream.

The client device uses the MPD to construct segments while the MPD is valid. In particular, the client device uses the MPD to construct segments until media time FT+MUP. That is, the greatest segment number (GSN) that can be constructed is:

$$GSN=\text{ceil}(FT+MUP-(AST+PS)-d)/d)+SSN=\text{ceil}(45/2)+22=45 \quad (3)$$

It should be understood that the latest segment may be shorter than the other segments. Before fetching any data beyond segment number 45, in the example above, the client device needs to fetch a new MPD, in accordance with MPEG-DASH.

More generally, to use the same concept with different timing and addressing schemes in DASH, the following values are introduced according to ISO/IEC 23009-1:
 the position of the segment in the Period denoted as k with k=1, 2, . . .
 the MPD start time of the segment at position k, referred to as MST(k)
 the MPD duration of a segment at position k, referred to as MD(k).

Assuming now that the wall-clock time at the client device is denoted as WT, the client device can derive the following information:
1. The latest available Period on the server, denoted by its period start time PST*
2. The segment availability start time of any segment at position k within the Period, denoted as SAST(k).
3. The position of the latest segment that is available on server in the Period, referred to as k*
4. The address of the latest segment that is available on server
5. The time when to fetch a new MPD based on the current presentation time, or more specifically, the greatest segment position k' within this Period that can be constructed by this MPD.
6. The media presentation time within the Representation that synchronizes closest to the live edge, MPTL.
7. The media presentation time within the Representation that synchronizes to other clients, MPTS.

Using these times, the client device can derive the values from above as:
1. The latest Period is obtained as the Period for which PST<=NTP.
2. The segment availability start time is obtained as $$SAST(k)=AST+PST+MST(k)+MD(k) \quad (4)$$

3. Within this Period the latest segment available on the client device is the segment at the position k* which results in the greatest value for SAST(k*) and at the same time is smaller than NTP.
4. The address of the latest segment is obtained by using the position information k* and then the segment address can be derived. The segment address depends on the addressing method.
5. Within this Period the greatest segment position k' that can be constructed by this MPD is the one that results in the greatest value for SAST(k') and at the same time is smaller than FT+MUP.

The client device can derive MPD times using this data. For example, if the @duration attribute is present and the value divided by the value of @timescale is denoted as d, then the client device, using conventional DASH techniques, derives the MPD times as:

MD(k)=d

MST(k)=(k−1)*d

In the case that the Segment base information contains a SegmentTimeline element with $N_s$ S elements indexed with s=1, ..., $N_s$, then (in DASH according to ISO/IEC 23009-1):

the t[s] is the value of @t of the s-th S element divided by the value of the @timescale attribute, the d[s] is the value of @d of the s-th S element divided by the value of the @timescale attribute.

the r[s] is the value of @r of the s-th S element (unless the @r value is −1, which means that the value is unknown and the @d may be used until updated information is available)

Thus, the client device can derive the MPD duration and start times as follows:

```
k=0
for s=1, ... Nₛ
    k = k + 1
    MST(k) = t[s]
    MD(k) = d[s]
    for j = 1, ..., r[s]
        k = k + 1
        MST(k) = MST(k−1) + d[s]
        MD(k) = d[s]
```

In DASH according to ISO/IEC 23009-1, the addressing method is independent of the usage of the timeline generation. The interpretation of the @startNumber depends on the addressing method. If the Representation contains or inherits one or more SegmentList elements, providing a set of explicit URL(s) for Media Segments, then the client device determines the position of the first segment in the segment list using @startNumber. The segment list then provides the explicit URLs. If the Representation contains or inherits a SegmentTemplate element with $Number$, then the URL of the media segment at position k is obtained by replacing the $NumberS identifier by (k−1)+@startNumber in the SegmentTemplate@media string. If the Representation contains or inherits a SegmentTemplate element with $Time$, then the client device obtains the URL of the Media Segment at position k by replacing the $TimeS identifier by MST(k) (de-normalized with the value if the timescale attribute) in the SegmentTemplate@media string.

Furthermore, in DASH according to ISO/IEC 23009-1, the client device schedules the playout based on the available information in the MPD. The client device determines the media presentation time in a Period for each Representation as presentation time value in the media segments minus the value of the @presentationTimeOffset, if present, for each Representation. Each segment at position k has assigned an earliest media presentation time EPT(k).

By offering an MPD, DASH according to ISO/IEC 23009-1 guarantees that:

1. Each segment in this Period is available prior to its earliest presentation time and its duration, i.e., for all k, SAST(k)<=EPT(k)+(AST+PST)+MD(k)    (5)

2. If each segment with segment number k is delivered starting at SAST(k) over a constant bitrate channel with bitrate equal to value of the @bandwidth attribute, then each presentation time PT is available at the client latest at time PT+(AST+PST)+MBT+MD(k)

3. A recommended playout-time MPTS (PT) for a presentation time when operating in sync with other clients is MPTS(PT)=(AST+PST)+PT+SPD.

4. Each segment in this Period is available at least until SAST(k)+TSB+MD(k).

Using this information, the client device can start scheduling playout, taking into account the information in the MPD as well the download speed. A suitable playout time is POT(PT)=MPTS(PT), if the attribute @suggestedPresentationDelay is present. If the attribute @suggestedPresentationDelay is not present, then a suitable playout time takes into account the first, second, and fourth constraint, i.e., the segment availability times at the server as well as the bitrate variability of the media stream.

Under DASH according to ISO/IEC 23009-1, the client device can use the MPD to construct and request segments until media time FT+MUP and the greatest segment position k' that can be constructed by this MPD is the one that results in the greatest value for SAST(k') and at the same time is smaller than FT+MUP. The latest segment may be shorter than the other ones.

In case the template construction with duration or with SegmentTimeline.S@r="−1" is used, the approach of DASH according to ISO/IEC 23009-1 may provide several advantages compared to the HLS and SmoothStreaming approach, such as 1. The MPD does not have to be updated on the server device as long as the segment construction can be continued. As long as the client device records the fetch time of the MPD, the client device can download the MPD ahead of time (or keep it in the buffer) for several different services.

2. Also, in a multicast environment, the MPD can be distributed only once or at least with a much smaller frequency than every second.

3. The client device has information indicating exactly the time when the next segment is available/published on the server device. This permits operation closer to the live edge as the client device request the segment as soon as the segment becomes available.

4. The client device can place the playout of the first segment the client device downloads accurately. The client device may even start playout in the middle of the segment to enable operation closer to the live edge.

5. The client device can synchronize its playout with other client devices.

6. Server device operation is simple, i.e., no dedicated server device is required DASH live streaming assumes that the client and server are synchronized in time, although the current specification leaves the time synchronization problem out and assumes it will be handled by such protocol as network time protocol (NTP). However, in lab tests, it has been observed that even when the client and server are initially synchronized, their clocks can differ from a few tens of milliseconds to a few seconds. There are two reasons for this. The first reason is that NTP is not a protocol designed to achieve millisecond accuracy. The second reason is that the clock on the client and the server may drift apart after an initial synchronization. Client and server time deltas of up to 20 seconds in the 24 hour duration after an NTP synchronization have been observed in heuristic testing.

One potential drawback of the client-server time delta is that the client's view of the segment availability time window for media segments may be skewed from the server's view. In the case where the client's view is substantially skewed, the client may send out a media segment request before the media segment becomes available, or after the media segment falls out of the availability time window. In both cases, the server will respond with an HTTP 404 error code and the client cannot successfully retrieve the segment. Such errors may cause start-up failure or interruption of playback. In a DASH live streaming system there is also a third device, the encoding system, that produces encoded video segments, stores them on the web server, and removes them later. Even with frequent re-synchronization between the client and web-server, clock drift may occur between the client and the encoding system, which may result in HTTP 404 errors when segments are fetched.

This disclosure describes a client-based method to estimate the time delta between the client device's clock and either or both of the server device's clock and the encoding system's clock. The estimated time delta can be used by the client device to adjust the time to send out subsequent media segment requests. Hence, implementing the techniques described by this disclosure may lead to a more robust playout experience.

In one example, a client device may be configured to estimate a time difference (also referred to as a drift or time delta) between the client device's internal clock and a server device's internal clock based on a time delta estimation algorithm. The time delta may also (additionally or alternatively) represent the difference between a clock of the client device and a time at which a particular segment is made available (and thus, not necessarily relative to the time indicated by a clock of the server device). The time at which a particular segment (or other unit of data) becomes available may be referred to herein as the availability time. The same time delta estimation algorithm of this disclosure may be applied in either or both scenarios.

The time delta estimation algorithm of this disclosure may be used under the following assumptions. A first assumption is that the time delta between client and server (or segment availability time) is bounded by within B seconds. If the actual time delta is larger than the assumed value B, this algorithm may be unable to estimate the time delta, in some cases. A second assumption is that the web server device supports pipelined requests. Otherwise, the estimation procedure may need to be modified to achieve the designed accuracy. A third assumption is that the available bandwidth between the client and server exceeds a minimum threshold, e.g., of 50 kbps, which is roughly the speed of a dial-up connection. Very slow network speed may increase the inaccuracy of the estimate. A fourth assumption is that the web server device is capable of handling up to a few dozen HTTP HEAD requests from the client device in negligible time (e.g., within a fraction of a second).

Furthermore, to implement the techniques of this disclosure, a client device may be configured to be able to estimate the time delta between the client device and a server device, at up to one Segment duration of granularity (e.g., one second). The estimation should also be produced within five seconds or ten round trip times (RTTs), whichever is larger. It may be advantageous if the time delta estimation algorithm can, when the actual time delta exceeds a designed time delta limit, automatically adjust internal parameters to be able to obtain an estimate, at a cost of reduced accuracy or prolonged estimation time.

The client device may also be configured to achieve an approximate synchronization with a server device initially. This can be done via one of a number of time synchronization protocols, such as network time protocol (NTP). However, there is no constraint on precisely how the client device achieves the initial time synchronization with the server device. The granularity of time delta estimation introduced in this disclosure may be bounded by the Segment duration and by the processing delay of all probing requests by the web server device. In other words, the granularity need not be finer than one segment duration, or the aggregate processing delay, whichever is larger. In general, the processing delay is assumed to be quite small and negligible compared to one segment time.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g. picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data. e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SET messages may be contained in non-VCL NAL units. SEI messages are the normative part of some standard specifications, and thus are not always mandatory for standard compliant decoder implementation. SEI messages may be sequence level SET messages or picture level SEI messages. Some sequence level information may be contained in SET messages, such as scalability information SET messages in the example of SVC and view scalability information SEI messages in MVC. These example SET messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g. a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g. video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets, in accordance with the techniques of this disclosure. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment. Retrieval unit 52 may initially synchronize an internal clock of client device 40 to a clock of server device 60 (or content preparation device 20), and then request segments from one or more of representations 68 (e.g., due to adaptation) as soon as the segments become available.

In some cases, however, an internal clock of client device 40 may drift relative to a clock of server device 60. Retrieval unit 52 may be configured to utilize the techniques of this disclosure to synchronize a clock of client device 40 to account for such drift. In this manner, retrieval unit 52 can use the resynchronized clock of client device 40 and data of manifest file 66 to determine whether particular files of one or more of representations 68 are available for retrieval.

In general, the techniques of this disclosure involve client device 40 sending out multiple probing requests (e.g., HTTP HEAD requests for media segments) to detect either or both "edges" of the segment availability window. The segment availability window may correspond to the set of segments that are currently available for retrieval. An "oldest" edge (also sometimes referred to as the "left" edge) may correspond to the beginning of the earliest segment of the segment availability window, while a "newest" edge (also sometimes referred to as the "right" edge) may correspond to the end of the most recent segment of the segment availability window. Based on these edges, retrieval unit 52 of client device 40 can infer the time delta between a clock of client device 40 and a clock of server device 60. In other words, retrieval unit 52 may determine the left and right edges of the segment availability window, based on responses to the probing requests provided by server device 60. These responses to the probing requests may be based on the understanding of the segment availability window of server device 60.

In general, the right edge of the segment availability window may be considered more useful, as the right edge is limited by real-time video production delay. Estimating the right edge can help achieve a good tradeoff between successful retrieval of segments, and minimization of unnecessary end-to-end latency. The left edge of the segment availability window is controlled by both the availability start time and the time shift buffer depth (TSBD). The TSBD is an optional attribute in the MPD (e.g., manifest file 66). For "dynamic" MPD types, the TSBD should be interpreted as "infinite" when missing from the MPD. When the TSBD is infinite, as long as the segment request time is after the segment availability start time, the segment should always be available.

The time delta estimation algorithm may include several parts, such as a start-up trigger logic, which may trigger the backward probing method when multiple failures occur during segment retrieval at start-up time. The backward probing method is designed to detect the right edge of segment availability window. Another method is called the forward probing method, which can be used when backward probing obtains an inconclusive response, or when the right edge of the segment availability window is detected and retrieval unit 52 of client device 40 wants to keep track of the right edge over time.

A few concepts related to the segment availability window may be helpful for better understanding the techniques of this disclosure. In DASH live streaming, the segments become available when the media production (e.g., by content preparation device 20) for a given segment completes and the media segment is stored on server device 60. Through the segment timeline calculation using information from the MPD (manifest file 66, in the example of FIG. 1), retrieval unit 52 of client device 40 can calculate the earliest time that a segment becomes available. This is termed the segment availability start time. In addition, through the time shift buffer, retrieval unit 52 can determine how long the segment will be available from the availability start time. Based on the requirement of the streaming application, retrieval unit 52 can be configured to retrieve a segment as soon as the segment becomes available or to retrieve a segment somewhat backward in time from the latest available segment.

These two strategies may each have advantages and disadvantages. The former strives to present to the viewer up-to-last-second content as much as possible, while potentially sacrificing stability in video delivery, especially when facing timing jitters in video production and delivery process. The latter typically can achieve an overall better user experience, at the possible expense of higher end-to-end latency. Using the segment timeline and TSBD, retrieval unit 52 can determine, at any given wall-clock time, which segments are available. An example of the segment availability window is explained with respect to FIG. 3 below.

Retrieval unit 52 may be configured to determine the segment availability window (or at least one edge of the segment availability window) for various reasons. For example, retrieval unit 52 may be configured to determine the segment availability window initially to begin a particular live stream. Additionally or alternatively, retrieval unit 52 may be configured to determine the segment availability window after receiving a certain number (or percentage) of error messages from server device 60, e.g., HTTP 404 error messages.

Such errors may occur when the clock of client device 40 deviates from the clock of server device 60 (or from an advertised time of availability). That is, in response to such clock drift, client device 40 will not accurately determine the segment availability timeline. In one case, the clock of client device 40 may be ahead of the clock of server device 60. If retrieval unit 52 tries to retrieve media segments as soon as retrieval unit 52 determines that the segments become available (using the clock of client device 40 and the segment availability start time) when the clock of client device 40 is ahead of the clock of server device 60, the client will receive HTTP 404 Not Available error messages in response to the media segment requests. If retrieval unit 52 uses a conservative start-up strategy, retrieval unit 52 can request media segments from the left edge of the TSBD (that is, the segment availability window), and thus, the segment retrieval may be successful. But even in that case, the clock delta may prevent retrieval unit 52 from building up an expected amount of media buffer.

A segment request failure trigger mechanism may be used to initiate the segment availability window determination process. The segment request failure trigger may activate after video playback starts and client device 40 repeatedly receives 404 error messages for media segment requests. Client device 40 may keep a running count on the number of consecutive media segment requests sent and the number of 404 error message responses obtained for those requests. If the client receives Nf or more 404 response code for the last Nr media segment requests, the probing method is triggered, where Nf is a configurable parameter defining the number of responses with 404 error code, and Nr is a configurable parameter defining the number of consecutive media segment requests sent. In some examples, Nr may have a value of 5, and Nf may have a value of 2.

An additional control parameter, minimum time interval (MTI), may be used to control how frequent probing tests are performed. MTI may describe the minimum time interval between sets of probe requests. This parameter may be used to ensure that the probing will not be performed too frequently to incur a high overhead. One example initial value of MTI is 1 minute. Other values of MTI may be used, e.g. as initial values or dynamically adjusted values based on frequency of errors received.

After retrieval unit 52 obtains a probing result, retrieval unit 52 may adjust retrieval behavior based on an estimated clock difference. Various actions may be performed, and these actions may be based on the trigger that caused the original probing.

In some instances, a failure to start playback may cause the probing. If the probing is preceded by failure to start playback of video data in the first place, or if client device 40 has already stalled before the probing algorithm finishes, a DASH client of client device 40 (which may correspond to retrieval unit 52) may be considered at an idle state. In this case, retrieval unit 52 may apply the time delta on a local clock of client device 40 to determine adjusted server time. Using the adjusted server time, retrieval unit 52 can start downloading from a determined time point. This may involve retrieval unit 52 going back in time to request segments a few seconds behind the latest available segment (in order to build up a reasonable buffer).

As another example, a successful playback with an inaccurate client clock may prompt the probing. When client device 40 is already playing back the video stream, by using the time delta estimation algorithm, client device 40 can determine that there exists a time delta between a local clock of client device 40 and a clock of server device 60. In this case, client device 40 may act in one of the following three ways. These client actions are described according to the following example. Assume that client device 40 is attempting to achieve an optimal tradeoff between media buffer and end-to-end latency, by requesting media content 10-seconds back from the latest available segment, in order to build up a 10-second buffer and achieve a 10-second latency. However, in the first case, the local clock of client device 40 is ahead of the clock of server device 60 by 5 seconds. As a result, client device 40 can only build up a maximum of a 5-second media buffer, and have a maximum of 5 second latency. In the second case, the local clock of client device 40 is behind the clock of server device 60 by 5 second. As a result, client device 40 will be able to build a 15-second buffer, at the expense of having a 15-second latency.

In one example, client device 40 may respond to successful playback by taking no special action. Client device 40 may determine not to perform any extra operations in response to detecting a time delta, because the actual media buffer of client device 40 and latency are 5-seconds off from the optimal tradeoff. In some instances, a different media buffer in client device 40 may result in different levels of aggressiveness in rate selection algorithm. Therefore, once the time delta (either the local clock of client device 40 is ahead or behind of the clock of server device 60), and the correct information is provided to the rate switching algorithm, the rate switching algorithm may naturally adjust internal parameters for rate decision aggressiveness.

In another example, client device 40 may perform an intrusive adjustment of playback of media data. For instance, in order to achieve a more optimal tradeoff of 10-second media buffer and 10-second latency, client device 40 may act drastically at the expense of temporarily degrading the viewing experience. In the first case, when the local clock of client device 40 is ahead, client device 40 may stall the video playback for 5 seconds and build up a targeted 10-second buffer. Once the buffer level reaches 10 seconds, client device 40 may resume the playback so that the buffer level and latency are at the targeted value. In the case when the local clock of client device 40 is behind, client device 40 can skip 5 seconds of video content and jump the presentation time by 5 seconds to arrive at the targeted presentation time (t−10). In this way, client device 40 may achieve a lower latency. In general, neither stall nor skip will result in good user experience. But if such operation is performed only once for the purpose of reducing further stalls or providing near real-time viewing experience, the drastic operations may be justified.

In this manner, when a time difference between a local clock of client device 40 and the clock of server device 60 indicates that the local clock is ahead of the clock of server device 60, client device 40 may stall media playback for a period of time equal to the time difference. On the other hand, when a time difference between the local clock of client device 40 and the clock of server device 60 indicates that the local clock is behind the clock of server device 60, client device 40 may skip media playback for a period of time equal to the time difference.

In yet another example, client device 40 may perform a non-intrusive adjustment of playback of media data. For instance, instead of using intrusive operations such as introducing a stall or a skip as discussed above, a more sophisticated client may use non-intrusive operations to achieve the same goal. When the local clock of client device 40 is ahead in time, client device 40 can slow down the rate play back slightly so that every 1 second of encoded media will be played in (1+α) seconds, where α is a small value such as 0.03. By slowing down the playback rate, client device 40 can gradually build up more media buffer and increase the latency. Similarly, when the local clock of client device 40 is behind the clock of server device 60 in time, client device 40 can slightly accelerate the rate of playback. By doing so, the client can gradually consume media buffer and reduce latency. Once client device 40 reaches the targeted media buffer and latency level, client device 40 can switch back to the normal playback rate to maintain the buffer level and latency. This example has the benefit that the viewer will not even be aware of the adjustment that client takes. Therefore, a better user experience can be provided as long as client device 40 can support such complex operations.

In this manner, when the time difference indicates that the local clock of client device 40 is ahead of the clock of server device 60, client device 40 may play the media data at a rate slightly above a normal playback rate until the time difference is zero. On the other hand, when the time difference indicates that the local clock of client device 40 is behind the clock of server device 60, client device 40 may play the media data at a rate slightly below a normal playback rate until the time difference is zero.

Video encoder 28, video decoder 48, audio encoder 26, audio decoder 46, encapsulation unit 30, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, and/or encapsulation unit 30, and/or decapsulation unit 50 may comprise an integrated circuit, a microprocessor, and/or a wireless communication device, such as a cellular telephone.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream. e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In this manner, client device 40 represents an example of a device for retrieving media data, the device including one or more processors configured to send a plurality of probe requests for segments of media data to a server device, wherein the server device provides the media data using a live streaming service, analyze responses to the plurality of probe requests to determine a left edge and a right edge of a segment availability window, and send a request for a segment within the segment availability window based on the determined left edge and the determined right edge of the segment availability window, in accordance with the live streaming service.

Figure 2:
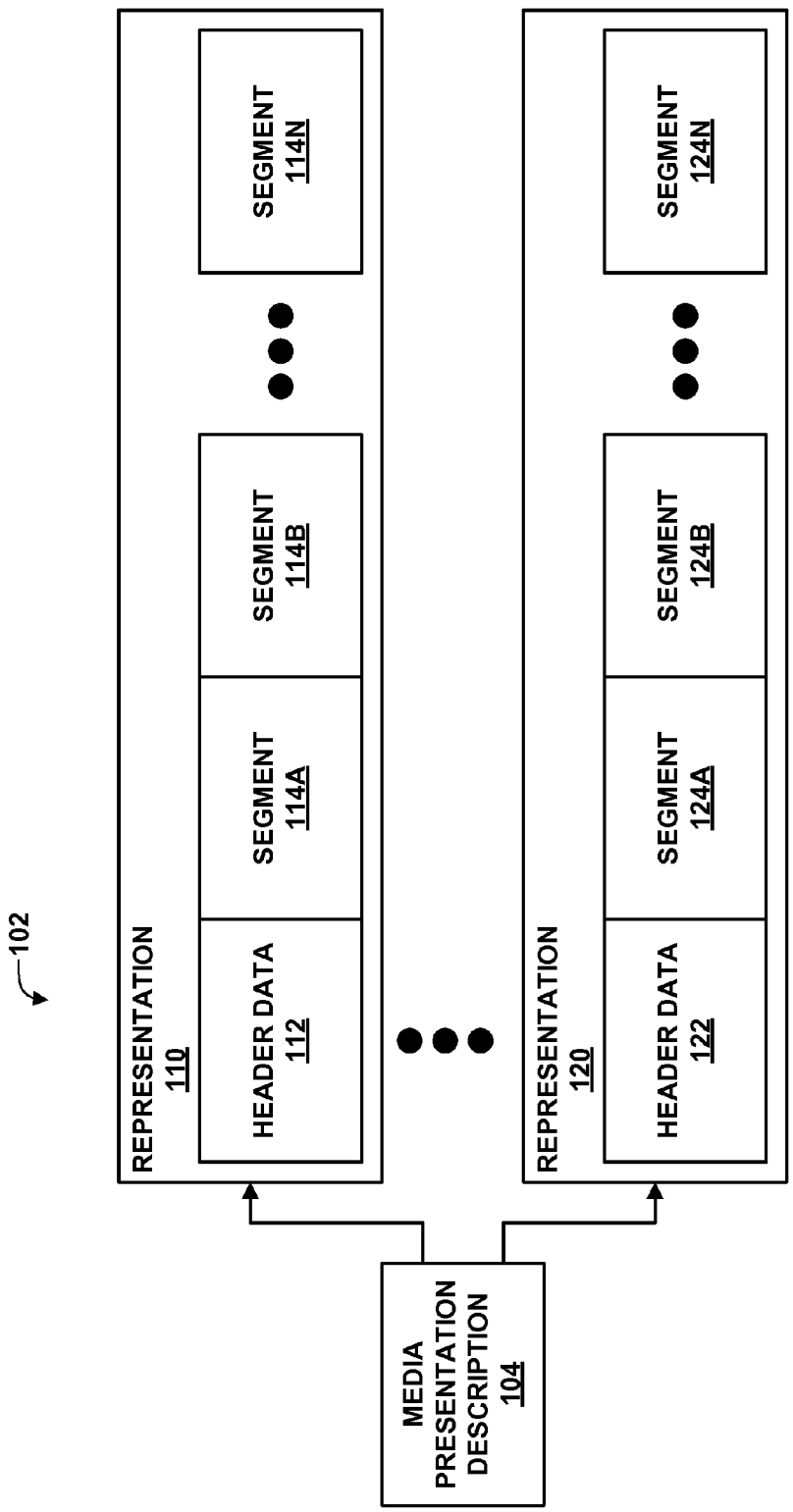
FIG. 2 is a conceptual diagram illustrating elements of example multimedia content.

FIG. 2 is a conceptual diagram illustrating elements of example multimedia content 102. Multimedia content 102 may correspond to multimedia content 64 (FIG. 1), or another multimedia content stored in storage medium 62. In the example of FIG. 2, multimedia content 102 includes media presentation description (MPD) 104 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 104 may comprise a data structure separate from representations 110-120. MPD 104 may correspond to manifest file 66 of FIG. 1. Likewise, representations 110-120 may correspond to representations 68 of FIG. 1. In general, MPD 104 may include data that generally describes characteristics of representations 110-120, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback). In accordance with the techniques of this disclosure, MPD 104 may include UTC Timing information, as discussed above with respect to FIG. 1.

Header data 112, when present, may describe characteristics of segments 114, e.g., temporal locations of random access points (RAPs, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 2. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

As explained above, MPD 104 may further include information that advertises when a first segment of representations 110, 120 is available. In this example, MPD 104 may include information indicating when segments 114A, 124A first become available. Thus, a client device, such as client device 40, may retrieve either of segments 114A, 124A at the indicated time. Moreover, MPD 104 may include information indicating the duration of segments 114, 124, in terms of playback time. Thus, client device 40 may determine the time at which segments 114B, 124B become available based on the time at which segments 114A, 124A become available (as indicated by MPD 104) and the durations of segments 114A, 124A (as also indicated by MPD 104). Segments 114, 124 may have the same durations (in terms of playback time), in which case MPD 104 may indicate a single duration value, or different durations, in which case MPD 104 may indicate separate duration values for each of segments 114, 124. Alternatively, assuming that segments 114, 124 are temporally aligned and have different durations, MPD 104 may signal individual duration values for corresponding segments (e.g., a duration value applicable to segments 114A, 114B, another duration value applicable to segments 114B, 124B, and so on).

In addition, assuming that multimedia content 102 is streamed live, certain ones of segments 114, 124 may only become available after a certain amount of time, in particular, after recording, encoding, and encapsulation of data. Client device 40 may use the techniques of this disclosure to determine a segment availability window, which may include any sequence of segments 114, 124, in various examples. That is, the segment availability window may be determined based on when segments are actually available, as indicated by responses to requests for the segments, rather than based strictly on advertised times of availability and clock synchronicity. These techniques are explained in greater detail below with respect to FIGS. 3-9.

Figure 3:
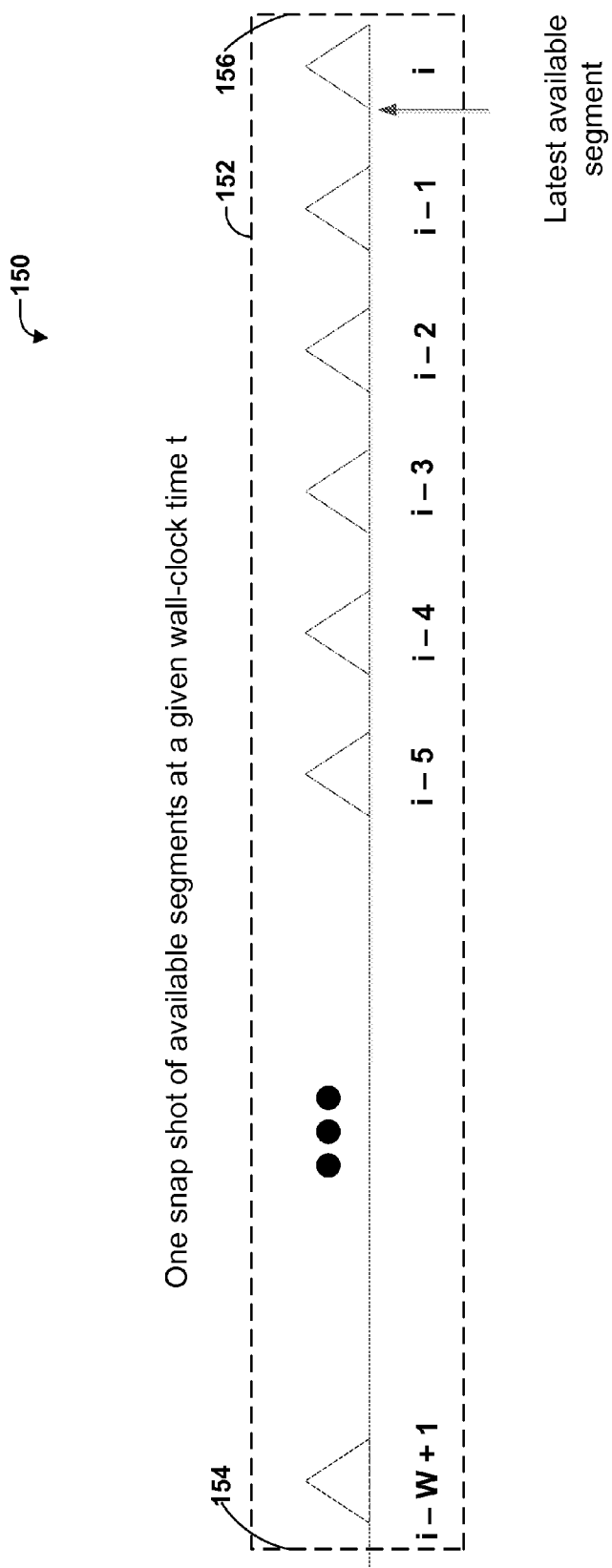
FIG. 3 is a conceptual diagram illustrating an example segment availability window for a set of segments.

FIG. 3 is a conceptual diagram illustrating an example segment availability window 152 for a set of segments 150. Segments are represented as triangles in FIG. 3. In this example, let the time shift buffer depth (TSBD) have a width of W segments. Furthermore, assume that client device 40 has determined that the latest available segment corresponds to the segment labeled "i" in FIG. 3, based on wall-clock time t. Based on these assumptions, FIG. 3 depicts a snapshot of the available segments, that is, segment availability window 152. In particular, segment availability window includes left edge 154, which begins with the segment at position i−W+1(i−(W−1)), and right edge 156, which ends with current segment i. The segment defining left edge 154 (i.e., the segment at position i−W+1) is shown using a dashed outline in FIG. 3.

In other words, client device 40 may send probing requests, such as HTTP HEAD requests, for media segments. In particular, client device 40 may substantially simultaneously send W probing requests, starting from the latest available segment (as determined according to the clock of client device 40) back in time. The time span covered by these probing requests may be W*D, where D is the duration of the segments, assuming the segments have an equal duration (in terms of playback time). This disclosure recognizes that most HTTP 404 errors in DASH are caused by the client device's clock being ahead of the server device's clock. Probing backward in time in this manner may be used to find the right edge of the TSBD window.

Figure 6:
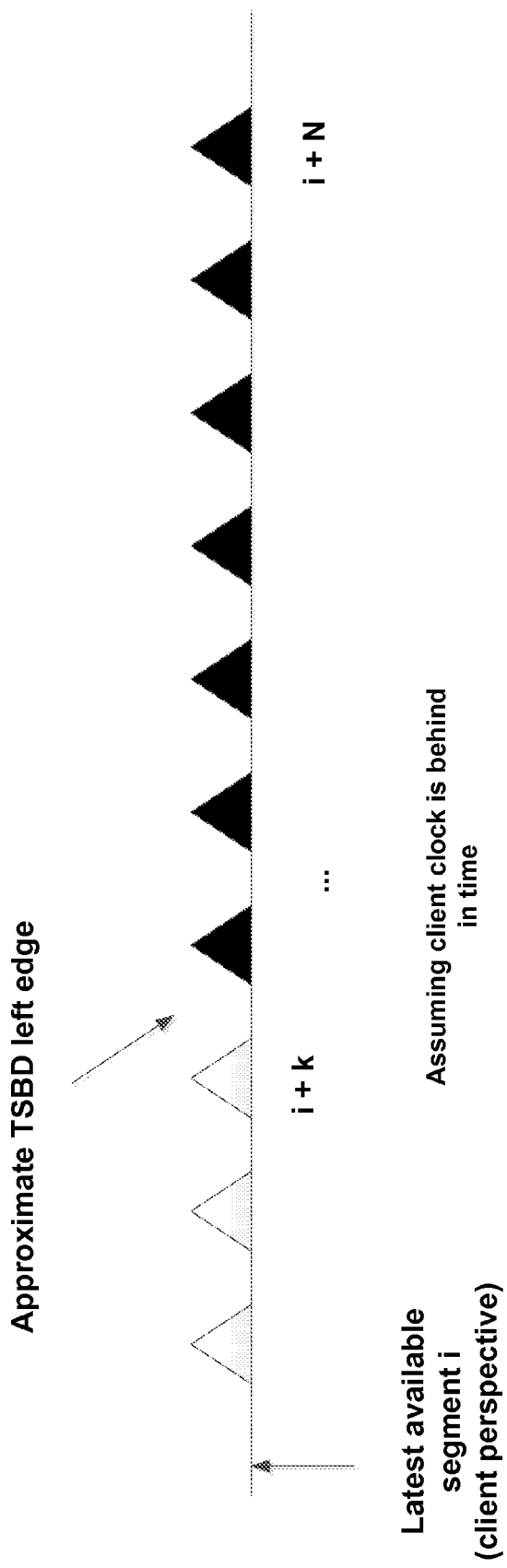
Figure 7:
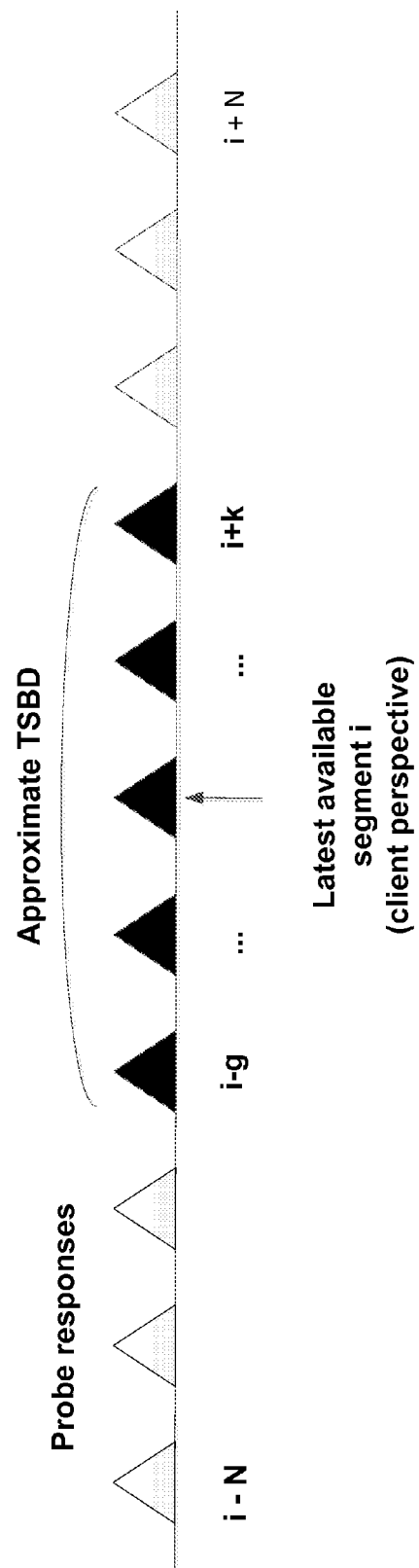

As an alternative, client device 40 may probe only forward in time. This is similar to backward probing, but can be used to deal with the problem where the clock of client device 40 is behind the clock of server device 60, by more than the TSBD duration. The left edge of the TSBD can be discovered by certain patterns, e.g., as shown in FIGS. 6 and 7 below. As yet another example, both forward and backward probe requests may be sent, as shown in FIG. 4, discussed in greater detail below.

Figure 4:
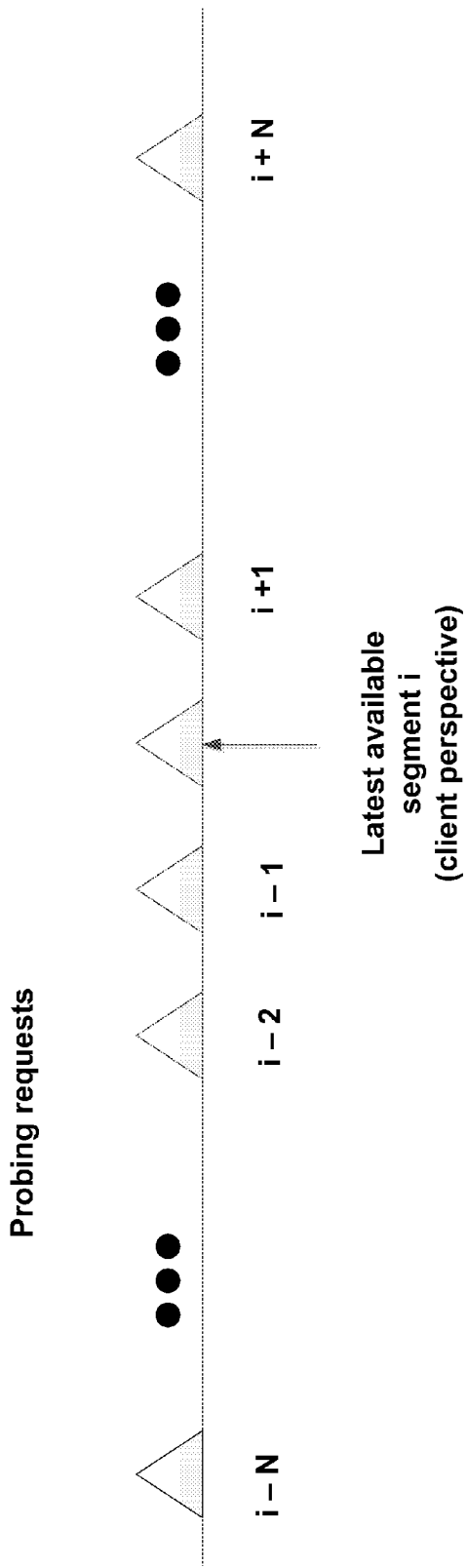
FIG. 4 is a conceptual diagram illustrating segments for which probing requests may be sent to determine a segment availability window.

FIG. 4 is a conceptual diagram illustrating segments for which probing requests may be sent to determine a segment availability window. As noted above, retrieval unit 52 of client device 40 may be configured to initiate the process for determining the segment availability window based on various criteria, such as receiving a certain number of 404 error messages from server device 60 or at stream start-up. In any case, retrieval unit 52 may, in accordance with the techniques of this disclosure, send a sequence of probe requests directed to a number of consecutive segments. In the example of FIG. 4, retrieval unit 52 sends probe requests (e.g., HTTP HEAD requests) for segments centered around segment i, which according to the clock of client device 40, is the latest available segment. In this example, the sequence of probe requests includes individual requests for each of the segments from i−N to i+N, where N is an integer value. However, in other examples, the sequence of probe requests may include individual requests for segments i−M to i+N, where M and N may be equal or unequal, and either of M or N may be zero.

In other words, once the probing method is initiated, client device 40 may send out a number of probing requests for media segments back-to-back (i.e., pipelined). In some examples, a probing request is an HTTP HEAD request for a given media segment, aimed at detecting the availability of the segment. In other examples, other types of requests may be used, such as HTTP partial GET requests for a relatively small amount of data (e.g., 100 bytes). At time t, retrieval unit 52 of client device 40 may calculate the latest available segment number i based on the clock of client device 40. In cases where the probing requests method is initiated by a start-up trigger, client device 40 may expect that a request for segment i will likely fail. So retrieval unit 52 may send out (2N+1) probing requests for segment i and its adjacent segments, ranging from segment (i−N) to segment (i+N). As these are very small HTTP requests with little to no data in the response message body, it may be expected that all requests will be received by the server within a relatively short amount of time, e.g., a one-second interval, and all responses may be expected to be received by client device 40 within a relatively short amount of time, e.g., a one-second interval. In other words, the aggregation of responses can be viewed as a snapshot of server device 60's view of the segment availability window.

Retrieval unit 52 of client device 40 may use responses to the probe requests to determine the left and/or right edges of the segment availability window. Additionally or alternatively, retrieval unit 52 may determine a difference (also referred to as the time delta) between the clock of client device 40 and the clock of server device 60. In particular, the time delta between client device 40 and server device 60 can be inferred based on the response pattern from server device 60 to the probing requests.

FIGS. 5-9 are conceptual diagrams illustrating various possible response patterns to the probing requests of FIG. 4 sent by retrieval unit 52. In FIGS. 5-9, darkly shaded triangles represent available segments, that is, segments for which the probing requests had error-free responses (e.g., HTTP 200 responses). In FIGS. 5-9, unshaded triangles represent unavailable segments, that is, segments for which the probing requests had error responses (e.g., HTTP 404 responses).

Figure 5:
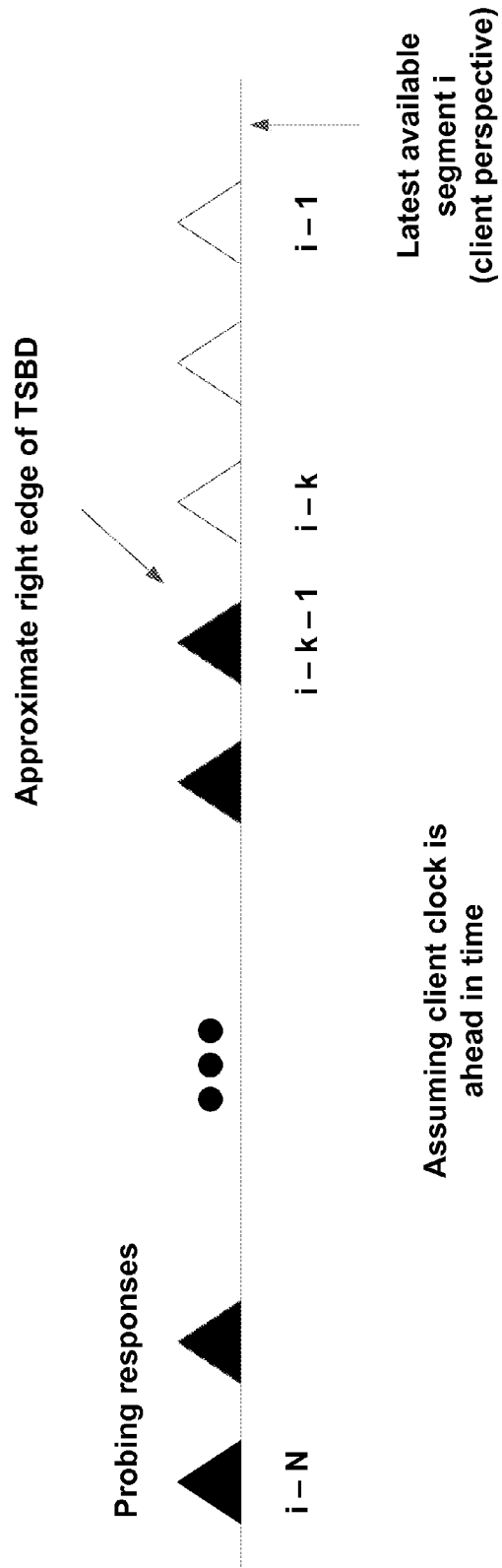
FIGS. 5-9 are conceptual diagrams illustrating various possible response patterns to the probing requests of FIG. 4.

FIG. 5 represents an example error pattern when the clock of client device 40 has drifted ahead of the clock of server device 60 (or, more generally, the advertised time for availability of segment i). In this example, the clock of client device 40 indicates that segment i is available. That is, the clock of client device 40 is equal to or exceeds the advertised available time for segment i, e.g., as advertised in an MPD, such as manifest file 66. However, the response pattern indicates that only segments up to segment i−k−1 are available. That is, responses to requests for segments (i−k) to i indicate HTTP 404 errors. Therefore, segment i−k−1 represents the right edge of the segment availability window. Based on the boundary between success and failure responses, retrieval unit 52 of client device 40 can estimate the time delta between a clock of client device 40. If for segments i to (i−k) the responses are 404 error codes, but from (i−k−1) to (i−N) the responses are 200 codes, retrieval unit 52 can estimate the time delta according to formula (6) below:

$$\text{time\_delta} \approx \Sigma_{j=i-k}^{i} D(j), \quad D(j)\text{:duration of Segment } j \quad (6)$$

When the segments have equal duration D, the estimated time delta may simply be (k+1)*D.

FIG. 6 represents an example error pattern when the clock of client device 40 is behind the clock of server device 60 (or, more generally, the advertised time for availability of segment i). When the clock of client device 40 is behind the advertised time of availability for segment i (e.g., behind the clock of server device 60) and this time difference causes segment request failures, it is typically because the clock of client device 40 is so far behind the clock of server device 60 that the segment request time has fallen out of the left edge of the TSBD (that is, the segment availability window). In this example, the clock of client device 40 indicates that segment i is available. That is, the clock of client device 40 may indicate a time that is equal to or greater than the advertised time for availability of segment i, but less than the time at which segment i is advertised to be removed from the segment availability window. However, the response pattern of FIG. 6 indicates that only segments following segment i+k are available.

When the response pattern shows 404 error codes from Segment i through Segment (i+k), and success code from Segment (i+k+1) and onward, the boundary between success and failure response codes (that is, between (i+k) and (i+k+1)) is considered the left edge of the TSBD (that is, the segment availability window). Retrieval unit 52 of client device 40 can infer the delta between the clock of client device 40 and the clock of server device 60 according to formula (7) below.

$$\text{time\_delta} \approx \Sigma_{j=i}^{i+k} D(j) + \text{TSBD}, \quad D(j)\text{: duration of Segment } j \quad (7)$$

FIG. 7 represents an example error pattern when the clock of client device 40 is within the segment availability window, but not completely synchronized with server device 60 (or, more generally, the advertised time for availability of segment i). As noted above, the trigger to initiate the probe requests process is optional. Thus, retrieval unit 52 may initiate the probe request process without a failed response trigger. Retrieval unit 52 may further perform the time delta estimate without a trigger from initial fail segment requests. This indicates when client device 40 can successfully retrieve media segments. Such a case can happen when the client's requested media segment falls within the TSBD (that is, the segment availability window), but there may still be a time delta between the clock of client device 40 and a time at which a segment actually becomes available (e.g., as indicated by the clock of server device 60).

Suppose the client receives the responses to probing requests as shown in FIG. 7. Between segment (i−g) and segment (i+k), the response codes are success (e.g., HTTP code 200). Outside this range, the response codes are HTTP 404 "not available." In this case, retrieval unit 52 of client device 40 can conclude that Segments in the range of Segment (i−g) to Segment (i+k) correspond to the TSBD (that is, the availability window). Retrieval unit 52 may determine that the clock of client device 40 is behind the clock of server device 60, and estimate the time delta according to formula (8) below.

$$\text{time\_delta} \approx \Sigma_{j=i}^{i+k} D(j) + \text{TSBD}, \quad D(j)\text{:duration of Segment } j \quad (8)$$

Figure 8:
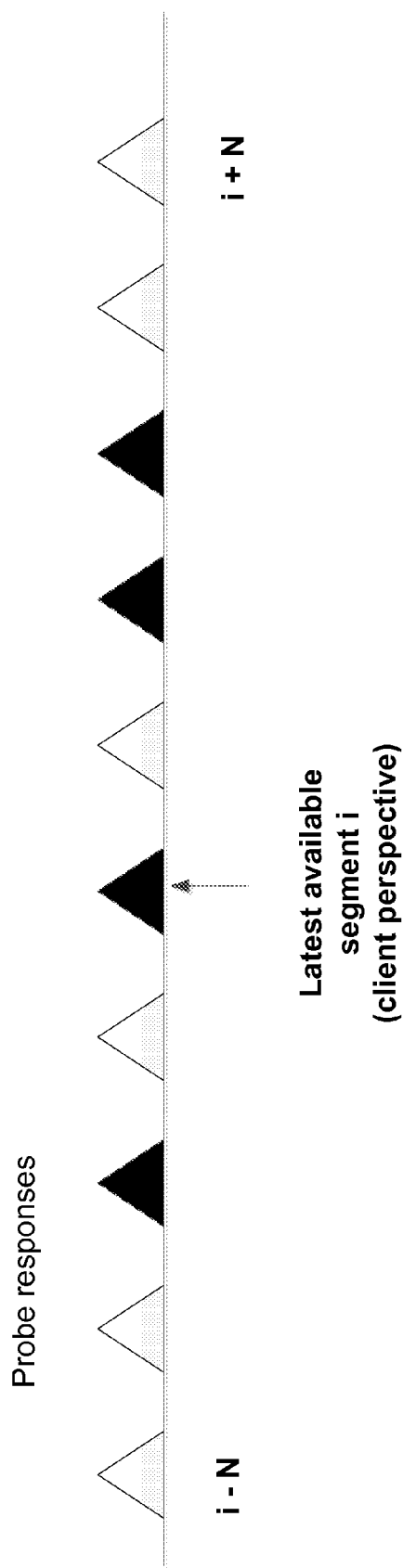
Figure 9:
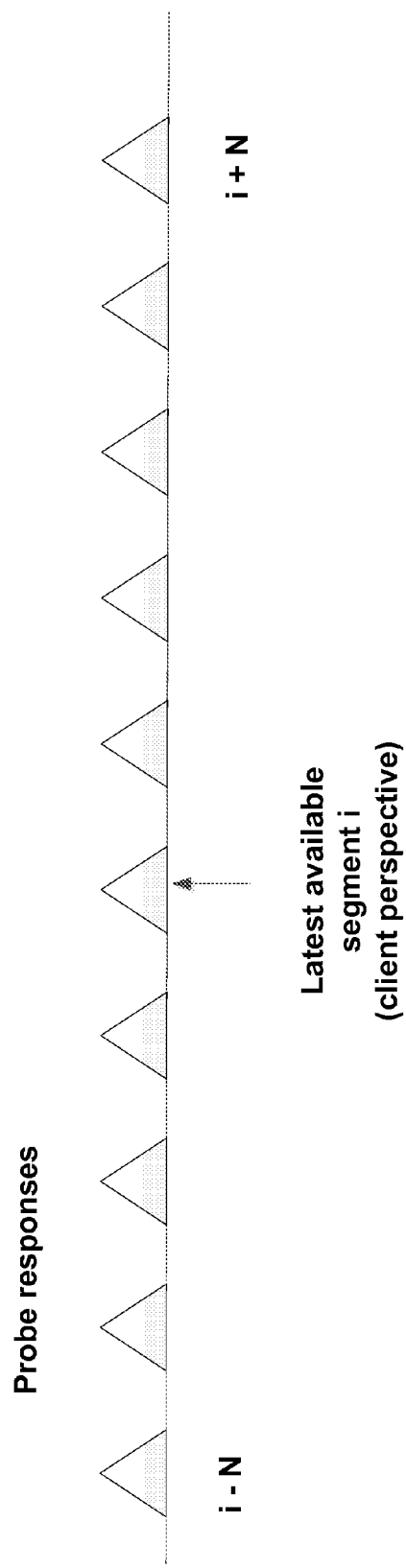

FIGS. 8 and 9 represent examples of inconclusive error patterns for estimating the time delta. Various response patterns, such as those shown in FIGS. 8 and 9, are considered inconclusive, and may require additional probe requests to be sent or may indicate errors other than unsynchronized clocks between client device 40 and server device 60.

In particular, FIG. 8 represents an example of mixed success and failure responses. In this case, the response pattern has successes and failures interleaved together. This indicates that the reason for failed responses is not entirely based on clock synchronization and segment request time. For example, at least some of the failed responses may be due to errors at the encoder or server, or at devices along a network path between the server and the client. When such a pattern occurs, the client cannot necessarily estimate a time delta based on the responses alone. The client may still be able to keep streaming the live video as long as enough segments can be retrieved.

FIG. 9 represents an example in which all responses to the probing requests are 404 errors. In this case, neither the left nor the right edge of the TSBD (that is, the segment availability window) can be found. Thus, retrieval unit 52 cannot estimate the time delta based on these probe requests alone. This response pattern may be caused by the client's clock falling out of sync by a large offset from the server's clock. The all-404 response pattern is not a terminal failure. It simply means that the time span covered by the set of probing requests is not large enough to find an edge of the TSBD. When such a response pattern occurs, retrieval unit 52 could adjust the interval of adjacent probing requests, such that the set of probing requests will cover a larger time span with coarser granularity. A hierarchical search method is described below, although the implementation complexity would be higher than the base estimation scheme.

Assume in this example that the segment duration D is fixed for all segments. The hierarchical search may start with a probing segment interval that is equal to D. The pseudo-code below describes one example of the hierarchical search.

Initialization:
Probing interval PI=D, max probing interval=M*D (M=$2^k$ and M*D<TSBD)

Main procedure:
while (PI <M*D)
{

```
        Form probing requests based on current client time t and
        probing interval
            D
        Run base delta estimation scheme with set of probing requests
        If TSBD edge is found, break out of loop; else PI = PI*2
    }
    If (TSBD edge found){
        While (PI > D){
            Adjust client's clock to center at newly estimated TSBD
                edge
            Re-run time delta estimate to obtain a more accurate TSBD
                edge estimate
            PI = PI/2
        }
    }
    else {
        Declare search failure
    }
```

Once retrieval unit 52 has estimated a time delta, retrieval unit 52 can record the time delta value to use an adjusted time to send out media segment request. The following example outlines such a process. Assume that the Period start time is 15:30:00 and live media segment uses a Segment number-based template with each media segment being 1 second long (in terms of playback duration). Based on the MPD, the first media segment's availability start time is 15:30:01. However, the DASH client (e.g., retrieval unit 52) cannot successfully retrieve media segments at the start-up time based on its local clock. Then, the DASH client runs the time delta estimation algorithm and estimates that its clock is 3 seconds ahead of the server's clock (or, the time at which the requested segment is actually available). Consider the current client clock is 15:30:35. The client first uses the estimated time delta to compute an estimate of the server clock, which is 15:30:32. Then, based on segment availability timeline, the client computes the latest available segment number as Segment #32 (instead of #35 based on client's local clock). After that, the client will send out a request for media Segment #32 and the server returns a 200 code with Segment data.

After obtaining a time delta estimate, retrieval unit 52 may keep track of the right edge of the TSBD (that is, the segment availability window) and avoid future clock drift. Retrieval unit 52 may implement various techniques to keep track of the right edge of the TSBD. In one example, retrieval unit 52 may periodically (e.g., every minute) send probing requests and perform the time delta estimate, as explained above. After the initial time delta estimate, the client has a good approximation of the right edge of TSBD. The subsequent probing requests may be centered at the old estimate of TSBD right edge. This will almost guarantee the success of subsequent time delta estimates and reduce the number of probing requests sent. In most cases, the subsequent time delta estimate will either re-confirm the old estimate or adjust the old estimate by a small value. This method is relatively easy to implement, as it requires a minimal amount state (old time delta) to be maintained by the DASH client (e.g., retrieval unit 52). But this method does not necessarily improve the accuracy of the time delta estimate, as the granularity is still limited by the segment duration.

Another approach is for retrieval unit 52 to push the boundary in terms of testing the exact edge of the TSBD (e.g., the exact right edge of the TSBD). Assume the clock of client device 40 indicates a wall-clock time t, and the initial time delta estimate result is a delta value d. To push the boundary, the client may introduce a new state variable p, which is a small time offset on the estimated server time. Instead of using a server time (t+d) as an estimate of the server time, the client may use an estimated server time (t+d+p). The method to push the boundary may proceed in several phases, as explained below.

In an initialization phase of the boundary pushing method, retrieval unit 52 uses d from the initial time delta estimate, sets p equal to 0, sets u equal to 100 milliseconds (where u is a fixed increment value for p in each step), and sets D as a segment duration value. In an additive increase offset of p phase (initiated with each successful media segment request), retrieval unit 52 sets p=p+u and determines that the estimated time for server device 60 is t+d+p. In an exponential decrease offset p phase (initiated with each failed media segment request), retrieval unit 52 sets p=p/2, until p<u, at which time retrieval unit 52 may re-estimate d. To re-estimate time delta d (e.g., when re-estimation is triggered during the exponential decrease offset p phase), retrieval unit 52 may perform a full time delta estimate procedure, as explained above (using probing requests). The probing requests may be centered at the old estimate of the TSBD right edge. This will almost guarantee production of a successful estimate. The newly estimated time delta d' replaces the old time delta value d. This method has the potential to fine tune the time delta estimate with much higher accuracy, at the cost of increased client side complexity. In particular, client device 40 maintains more state information in this example.

Retrieval unit 52 may implement one or more optimizations to these techniques, alone or in any combination. For example, retrieval unit 52 may maintain a particular order of the probing requests sent to server device 60. As the client sends out the probing requests back-to-back in a sequential manner, it is important to note that most media retrieval failures are caused by the clock of client device 40 getting ahead of the clock of server device 60 (or getting ahead of the time at which a segment becomes available). Therefore, client device 40 may send out the probing requests from back in time to forward in time, e.g., starting from probing request for segment (i−N) to (i+N). Such a request order may improve the likelihood of a successful estimate, even if the server can only handle a limited number of probing requests in a timely fashion, as the assumption of time delta estimation is based on almost-same-time processing of the probing requests adjacent to the edge of TSBD (i.e. segment availability window).

As another example, retrieval unit 52 may characterize the response patterns. One practical method for characterizing the response patterns to probing requests is to start from the response for the backward-most request and count the number of times the response message type has changed. For example, in FIGS. 5, 6, and 7, the number of response code changes is 1, 1, and 2, respectively. However, in FIGS. 8 and 9, the number of response code changes is 6 and 0, respectively. It can be seen that only when the number of response code changes is 1 or 2, the response pattern can be used to infer the edge of TSBD.

As another example, retrieval unit 52 may be configured according to a "one-segment prior" rule. That is, because the time delta estimate has a granularity of one segment duration, it is advised that after adjusting the clock of client device 40 with the time delta, the most advanced media segment retrieval unit 52 should request is the media segment that has been available prior to the latest available media segment. In other words, retrieval unit 52 may be configured to not chase the right edge of TSBD, but to instead back off by one segment to accommodate any inaccuracy in the time delta estimate.

The variable N discussed above may be modified through configuration. In some examples, N corresponds to the number of probing requests to send in each direction (backward and forward) from what retrieval unit 52 determines is the latest available segment, i. Empirical testing has shown that after an NTP synch between a client device and a server device, the client device's clock can drift off from the server device's clock up to a few seconds within an hour, and up to 20 seconds within a 24-hour period. Therefore, the parameter N may depend on the time that has elapsed since the client device last synchronized with the network time source. For example, retrieval unit 52 may be configured to use data according to Table 1 below to determine the value of N based on the elapsed time since the last synch with server device 60. Client device 40 may resynchronize with server device 60 periodically and/or at certain defined times, e.g., once per day (or 24-hour period), at the beginning of a streaming session, and/or periodically during the streaming session (e.g., every few minutes).

TABLE 1

| Time since last synchronization | Value for N |
| --- | --- |
| ≤1 minute | 10 |
| >1 minute but ≤10 minutes | 15 |
| >10 minutes but ≤1 hour | 20 |
| >1 hour | 25 |

Figure 10:
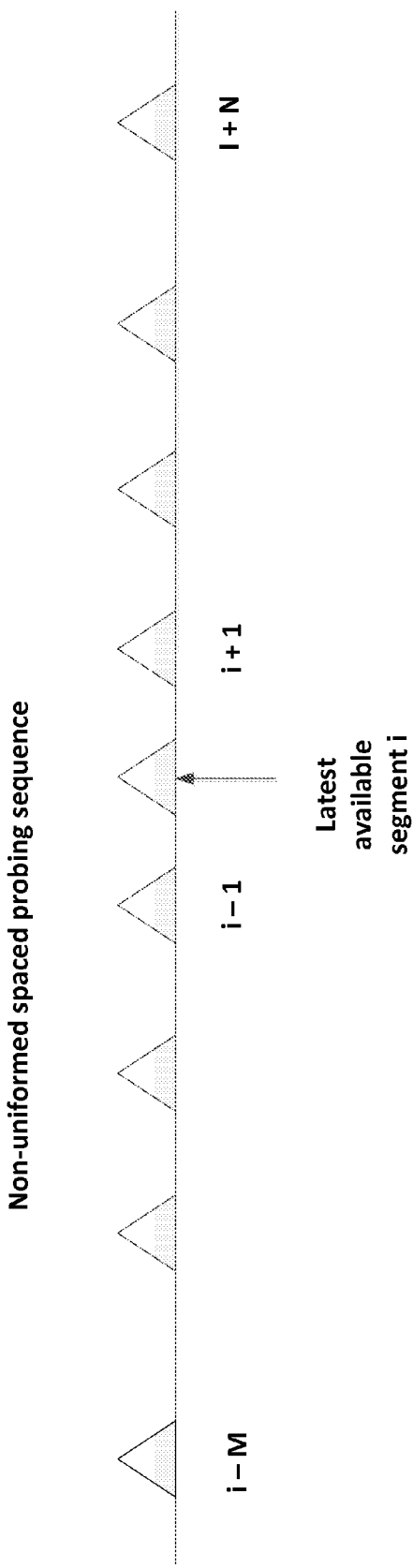
FIG. 10 is a conceptual diagram illustrating an example of a non-uniformly spaced probing sequence.

FIG. 10 is a conceptual diagram illustrating an example of a non-uniformly spaced probing sequence. A probing sequence can be either uniformly spaced, in which adjacent probing packets target two segments that are apart by a fixed number of segments, or non-uniformly spaced, in which adjacent probing packets can target two segments that have a variable number of segments in between them, as long as the spacing of segments in terms of presentation time is less than the TSBD (that is, the segment availability window). One pattern of non-uniformly spaced probing sequence is illustrated in the example of FIG. 10. At the center of the probing sequence, the spacing between the targeted segments by probing packets is small. As the probing packets move further away from the center, the spacing between the targeted segments increases. Such a design may be helpful to achieve a large time coverage by the probing sequence, while maintaining a good time granularity around the center of the probing sequence.

Figure 11:
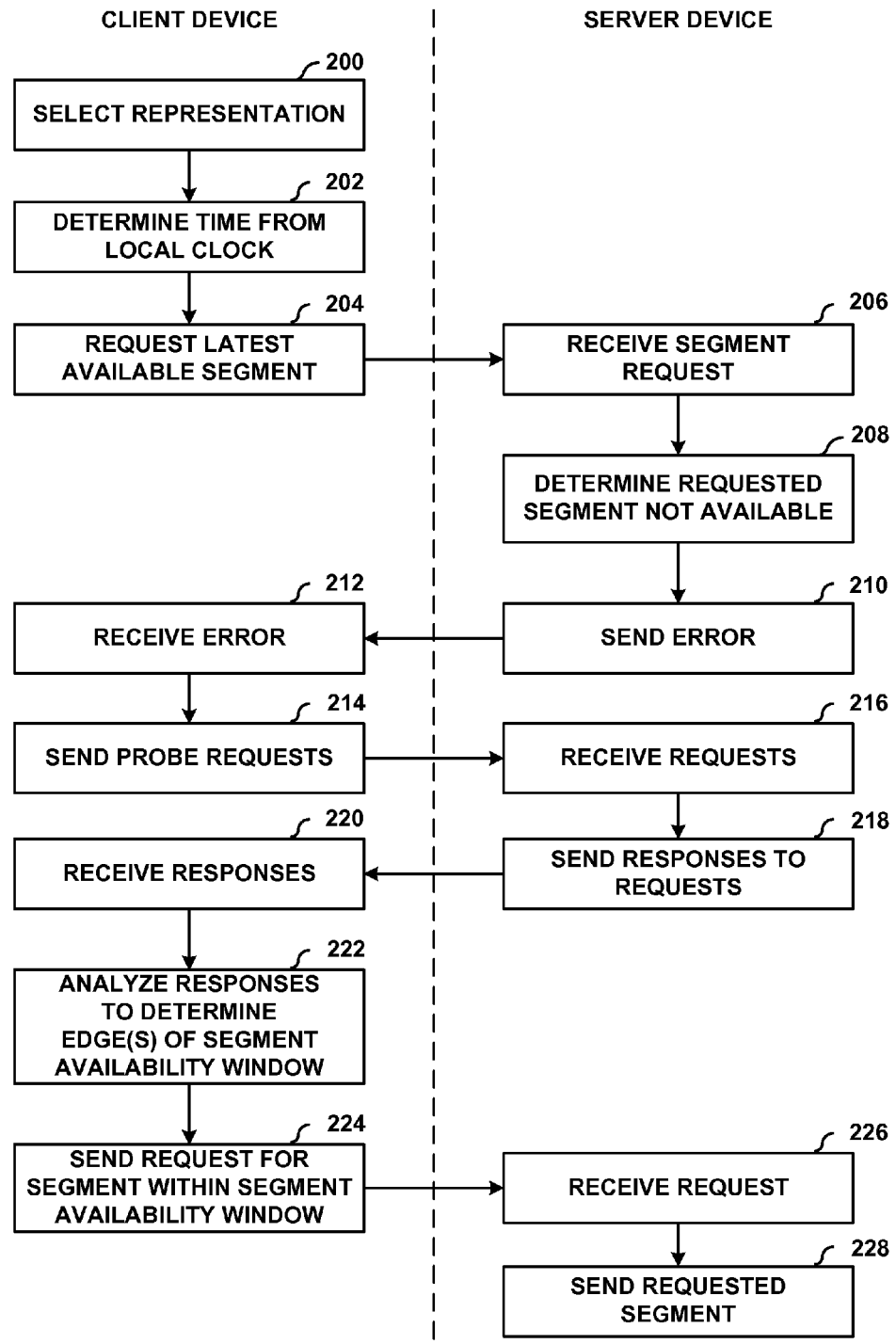
FIG. 11 is a flowchart illustrating an example method for determining one or more edges of a segment availability window in accordance with the techniques of this disclosure.

FIG. 11 is a flowchart illustrating an example method for determining one or more edges of a segment availability window in accordance with the techniques of this disclosure. The method of FIG. 11 is shown as being performed by a client device (e.g., client device 40) and a server device (e.g. server device 60). Although described with respect to client device 40 and server device 60 of FIG. 1, it should be understood that other devices may be configured to perform a substantially similar method to that of FIG. 11. Furthermore, it should be understood that additional or alternative steps may be performed in a method consistent with that of FIG. 11.

It is presumed that the method of FIG. 11 is performed after client device 40 has received an MPD or other manifest file from server device 60 for particular media content. Moreover, the MPD may include data that defines times at which segments of the media content are to be available for retrieval. These times may be advertised with respect to a clock of server device 60 or with respect to a clock of another device or entity, such as content preparation device 20. Thus, client device 40 may determine times at which segments of the media content are to be available, as well as times at which the segments are no longer available for retrieval.

The MPD may further include information defining characteristics of various representations, such as representations within adaptation sets and bandwidths of representations within the adaptation sets. Client device 40 may select one of the representations (200) based on, e.g., characteristics of the adaptation sets, bitrates of the available representations, and a current estimated available bandwidth. Client device 40 may also determine a current time from a local clock, that is, a clock of client device 40 (202). For example, client device 40 may compare the current time, as indicated by the local clock, to the times at which segments are advertised to become available. Client device 40 may then determine a segment i having the latest available time, that is, a time of availability less than or equal to the current time indicated by the local clock, but greater than all other segments of the selected representation. This segment i may be referred to as the latest available segment, as indicated by the local clock of client device 40.

Based on this determination, client device 40 may send a request for the latest available segment (e.g., segment i) from server device 60 (204). This request may correspond to, for example, an HTTP Get or partial GET request. Server device 60 may receive this segment request from client device 40 (206). However, assuming that the local clock of client device 40 has drifted relative to the actual time at which the segment is to become available (e.g., relative to the clock of server device 60, content preparation device 20, or another such device), segment i may not actually be available yet. In the example of FIG. 11, it is presumed that segment i is not available at the time when server device 60 receives the request, and thus, server device 60 determines that the requested segment is not available (208) and sends an error, such as an HTTP 404 error, to client device 40 (210).

Client device 40 may receive the error (212) and determine, based on the error, that the local clock of client device 40 has drifted relative to the actual time at which segment i is to become (or did become) available. Thus, client device 40, in accordance with the techniques of this disclosure, may send probe requests to server device 60 (214). The probe requests may correspond to HTTP HEAD requests or partial GET requests for a very small amount of data, e.g., up to 100 bytes of data. Client device 40 may send the probe requests as discussed above with respect to FIG. 4. For instance, client device 40 may send the probe requests such that one or more probe requests are directed to segments earlier than segment i, and one or more probe requests are directed to segments later than segment i.

Server device 60 may then receive the requests (216) and send responses to the requests (218). Assuming the probe requests are HTTP HEAD requests, server device 60 may send header information for those segments that are currently available (referred to below as "successful" probe responses), and error messages (e.g., HTTP 404 errors) for those segments that are not currently available.

Client device 40 may receive the responses (220) and analyze the responses to determine one or more edges of the segment availability window (222). For instance, if the pattern of successful probe responses and error messages resembles the pattern illustrated in FIG. 5, as discussed above, client device 40 may identify the latest segment (e.g., segment i−k−1) having a successful probe response as the right edge of the segment availability window. Moreover, client device 40 may determine a time delta between segment i and the right edge of the segment availability window (in this case, k+1) to determine an offset to be applied to the local clock, in order to avoid error responses to subsequent requests for segments. Client device 40 may determine the time delta using formula (6) as discussed above, in this example.

As another example, if the pattern of successful probe responses and error messages resembles the pattern illustrated in FIG. 6, client device 40 may determine the left edge of the segment availability window. In this example, client device 40 may also calculate a time delta, e.g. using formula (7) as discussed above. As still another example, if the pattern of successful probe responses and error messages resembles the pattern illustrated in FIG. 7, client device 40 may determine both the left edge and the right edge of the segment availability window. In this example, client device 40 may also calculate a time delta, e.g., using formula (8) as discussed above. In the case that the successful probe responses and error messages resembles the pattern illustrated in FIG. 9, client device 40 may perform the hierarchical search method to identify the left and/or right edges of the segment availability window. Furthermore, if only one of the left or right edges are discovered, client device 40 may send additional probe packets to discover the other edge of the segment availability window (though not shown in FIG. 11).

In any case, after determining at least one edge of the segment availability window, client device 40 may send a request for a segment within the segment availability window (224). For instance, in the example discussed above, client device 40 may send a request for segment i−k−1. Server device 60 may then receive the request (226) and send the requested segment to client device 40 (228).

It should be understood that client device 40 may perform the probe packet method described in FIG. 11 in response to various triggers, such as when one or more errors for segments are received (e.g. consecutively), in response to initially beginning a streaming session, an elapsed amount of time since a last set of probe packets were sent (which may also influence the number of probe packets to be sent), any combination of these triggers, and other additional or alternative triggers.

In this manner, the method of FIG. 11 represents an example of a method of retrieving media data, the method including sending a plurality of probe requests for segments of media data to a server device, wherein the server device provides the media data using a live streaming service, analyzing responses to the plurality of probe requests to determine a left edge and a right edge of a segment availability window, and sending a request for a segment within the segment availability window based on the determined left edge and the determined right edge of the segment availability window, in accordance with the live streaming service.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:

sending a plurality of probe requests for segments of media data to a server device, wherein the server device provides the media data using a live streaming service;

analyzing responses to the plurality of probe requests to determine a left edge and a right edge of a segment availability window;

determining a time difference between a local clock of a client device and a clock of a server device based at least in part on the determined left edge or the determined right edge; and sending a request for a segment based at least in part on the determined time difference that is based at least in part on the determined left edge or the determined right edge, in accordance with the live streaming service.

2. The method of claim 1, wherein the probe requests comprise requests for an amount of data of the segments that is smaller than the full amount of data for the segments.

3. The method of claim 1, wherein the probe requests comprise HTTP HEAD requests.

4. The method of claim 1, wherein the probe requests comprise HTTP partial GET requests.

5. The method of claim 1, wherein the segment availability window comprises an updated segment availability window, the method further comprising, prior to sending the plurality of probe requests:

sending a plurality of requests for segments within an originally determined segment availability window; and determining that responses to the requests for the segments within the originally determined segment availability window include a number of HTTP 404 errors, wherein sending the plurality of probe requests comprises sending the plurality of probe requests based on the number of HTTP 404 errors in the responses to the requests for the segments within the originally determined segment availability window.

6. The method of claim 1, wherein sending the plurality of probe requests comprises sending the plurality of probe requests upon initiating an HTTP streaming session to retrieve the media data.

7. The method of claim 1, wherein analyzing the responses comprises:

determining that responses to requests for earlier segments indicated successes and that responses to requests for later segments indicated failures; and based on the determination that the responses to the requests for earlier segments indicated successes and the responses to the requests for later segments indicated failures, determining that the right edge of the segment availability window is between the segments for which the responses indicated successes and the segments for which the responses indicated failures.

8. The method of claim 7, further comprising calculating a time delta value according to:

time_delta$\approx \Sigma_{j=i-k}^{i} D(j)$, wherein D(j) defines a duration of segment j, wherein i represents an estimated available segment based on a clock of a client device and k represents a number of segments between segment i and a latest segment for which the responses indicated a success.

9. The method of claim 1, wherein analyzing the responses comprises:

determining that responses to requests for later segments indicated successes and that responses to requests for earlier segments indicated failures; and based on the determination, determining that the left edge of the segment availability window is between the segments for which the responses indicated successes and the segments for which the responses indicated failures.

10. The method of claim 9, further comprising calculating a time delta value according to:

time_delta$\approx \Sigma_{j=i}^{i+k} D(j)+TSBD$, wherein D(j) defines a duration of segment j, wherein i represents an estimated available segment based on a clock of a client device, TSBD represents a time shift buffer depth, and k represents a number of segments between segment i and an earliest segment for which the responses indicated a success.

11. The method of claim 1, wherein analyzing the responses comprises:

determining that responses to requests for earlier segments indicated failures, that responses to requests for later segments indicated failures, and that responses to requests for intermediate segments between the earlier segments and the later segments indicated successes; and based on the determination, determining that the left edge of the segment availability window is between the earlier segments and the intermediate segments and that the right edge of the segment availability window is between the intermediate segments and the later segments.

12. The method of claim 11, further comprising calculating a time delta value according to:

time_delta$\approx \Sigma_{j=i+1}^{i+k} D(j)$, wherein D(j) defines a duration of segment j, wherein i represents an estimated available segment based on a clock of a client device and k represents a number of segments between segment i and a latest segment for which the responses indicated a success.

13. The method of claim 1, wherein the plurality of probe requests comprises a second plurality of probe requests, the method further comprising, prior to sending the second plurality of probe requests, sending a first plurality of probe requests covering a first amount of playback time, wherein sending the second plurality of probe requests comprises sending the second plurality of probe requests after determining that responses to the first plurality of probe requests indicated failures, and wherein the second plurality of probe requests covers a second amount of playback time greater than the first amount of playback time.

14. The method of claim 13, further comprising determining a number of probes to be included in the second plurality of probe requests using a hierarchical search method.

15. The method of claim 1, wherein sending the plurality of probe requests comprises sending the plurality of probe requests such that earlier probe requests correspond to earlier segments and later probe requests correspond to later segments.

16. The method of claim 1, wherein analyzing the responses comprises calculating a number of changes between types of responses, wherein a first type of response indicates that a corresponding segment is available and a second type of response indicates that the corresponding segment is not available.

17. The method of claim 16, further comprising determining the left edge and the right edge of the segment availability window only after determining that the calculated number of changes between types of responses is equal to 1 or 2.

18. The method of claim 1, wherein sending the request for the segment comprises sending a request for a segment that is one segment behind the right edge.

19. The method of claim 1, further comprising determining a number of probe requests to include in the plurality of probe requests based on an elapsed amount of time since a last time synchronization with the server device.

20. The method of claim 19, wherein determining the number of probe requests comprises determining that the number of probe requests is equal to: 10 when the elapsed amount of time is less than or equal to one minute, 15 when the elapsed amount of time is greater than one minute and less than or equal to 10 minutes, 20 when the elapsed amount of time is greater than ten minutes but less than or equal to one hour, and 25 when the elapsed amount of time is greater than one hour.

21. The method of claim 1, further comprising synchronizing a clock of a client device with the server device prior to initiating a streaming session to request the media data.

22. The method of claim 21, wherein synchronizing comprises synchronizing using network time protocol (NTP).

23. The method of claim 1, further comprising periodically synchronizing a clock of a client device with the server device.

24. The method of claim 23, wherein periodically synchronizing comprises synchronizing the clock of the client device with the server device every N minutes.

25. The method of claim 1, wherein sending the request comprises sending the request in accordance with live dynamic adaptive streaming over HTTP (DASH).

26. The method of claim 1, wherein sending the plurality of probe requests comprises sending the plurality of probe requests in response to a failure to play back the media data after sending a request for the media data, the method further comprising:
   determining a time difference between a local clock of a client device and a clock of a server device based at least in part on the determined left edge and the determined right edge; and
   adjusting the local clock based on the determined time difference,
   wherein sending the request comprises sending the request based on the adjusted local clock.

27. The method of claim 1, wherein the time difference indicates that the local clock is ahead of the clock of the server device, the method further comprising stalling media playback for a period of time equal to the time difference.

28. The method of claim 1, wherein the time difference indicates that the local clock is behind the clock of the server device, the method further comprising skipping media playback for a period of time equal to the time difference.

29. The method of claim 1, wherein the time difference indicates that the local clock is ahead of the clock of the server device, the method further comprising playing the media data at a rate slightly above a normal playback rate until the time difference is zero.

30. The method of claim 1, wherein the time difference indicates that the local clock is behind the clock of the server device, the method further comprising playing the media data at a rate slightly below a normal playback rate until the time difference is zero.

31. A method of retrieving media data, the method comprising:
   sending a plurality of probe requests for segments of media data to a server device, wherein the server device provides the media data using a live streaming service;
   analyzing responses to the plurality of probe requests to determine a left edge and a right edge of a segment availability window;
   determining a time delta representing a difference between a time at which a segment is actually available and a time at which a clock of a client device indicates that the segment is available; and
   requesting one or more of the segments based on the time delta, wherein requesting comprises sending a request for a segment based on the determined left edge or the determined right edge of the segment availability window, in accordance with the live streaming service.

32. The method of claim 31, further comprising periodically updating the time delta using subsequent pluralities of probe packets.

33. The method of claim 31, further comprising increasing the time delta by one or more small increments to attempt to determine an exact right edge of the segment availability window.

34. A device for retrieving media data, the device comprising one or more processors configured to send a plurality of probe requests for segments of media data to a server device, wherein the server device provides the media data using a live streaming service, analyze responses to the plurality of probe requests to determine a left edge and a right edge of a segment availability window, determine a time difference between a local clock of a client device and a clock of a server device based at least in part on the determined left edge or the determined right edge, and send a request for a segment based at least in part on the determined time difference that is based at least in part on the determined left edge or the determined right edge, in accordance with the live streaming service.

35. The device of claim 34, wherein the probe requests comprise one of HTTP HEAD requests and HTTP partial GET requests.

36. The device of claim 34, wherein the one or more processors are configured to send the plurality of probe requests based on at least one of a determination that responses to previous requests included a number of HTTP 404 errors and initiation of an HTTP streaming session.

37. The device of claim 34, wherein to analyze the responses, the one or more processors are configured to determine that responses to requests for earlier segments indicated failures, that responses to requests for later segments indicated failures, and that responses to requests for intermediate segments between the earlier segments and the later segments indicated successes, and, based on the determination, determine that the left edge of the segment availability window is between the earlier segments and the intermediate segments and that the right edge of the segment availability window is between the intermediate segments and the later segments.

38. The device of claim 37, wherein the one or more processors are configured to calculate a time delta value according to:
   $\text{time\_delta} \approx \sum_{j=i+1}^{i+k} D(j)$, wherein $D(j)$ defines a duration of segment j, wherein i represents an estimated available segment based on a clock of a client device and k represents a number of segments between segment i and a latest segment for which the responses indicated a success.

39. The device of claim 34, wherein the plurality of probe requests comprises a second plurality of probe requests, and wherein the one or more processors are configured to, prior to sending the second plurality of probe requests, send a first plurality of probe requests including fewer probe requests than the second plurality of probe requests, and to send the second plurality of probe requests after determining that responses to the first plurality of probe requests indicated failures.

40. A device for retrieving media data, the device comprising one or more processors configured to send a plurality of probe requests for segments of media data to a server device, wherein the server device provides the media data using a live streaming service, analyze responses to the plurality of probe requests to determine a left edge and a right edge of a segment availability window, determine a time delta representing a difference between a time at which a segment is actually available and a time at which a clock of a client device indicates that the segment is available, and request one or more of the segments based on the time delta, wherein to request the one or more segments, the one or more processors are configured to send a request for a segment based on the determined left edge or the determined right edge of the segment availability window, in accordance with the live streaming service.

41. A device for retrieving media data, the device comprising:
   means for sending a plurality of probe requests for segments of media data to a server device, wherein the server device provides the media data using a live streaming service;
   means for analyzing responses to the plurality of probe requests to determine a left edge and a right edge of a segment availability window;
   means for determining a time difference between a local clock of a client device and a clock of a server device based at least in part on the determined left edge or the determined right edge; and
   means for sending a request for a segment based at least in part on the determined time difference that is based at least in part on the determined left edge or the determined right edge, in accordance with the live streaming service.

42. The device of claim 41, wherein the probe requests comprise one of HTTP HEAD requests and HTTP partial GET requests.

43. The device of claim 41, wherein the means for sending the plurality of probe requests comprise at least one of means for sending the plurality of probe requests based on a number of HTTP 404 errors received in response to previous requests and means for sending the plurality of probe requests based on initiation of an HTTP streaming session.

44. The device of claim 41, wherein the means for analyzing the responses comprises:
   means for determining that responses to requests for earlier segments indicated failures, that responses to requests for later segments indicated failures, and that responses to requests for intermediate segments between the earlier segments and the later segments indicated successes; and
   means for determining, based on the determination, that the left edge of the segment availability window is between the earlier segments and the intermediate segments and that the right edge of the segment availability window is between the intermediate segments and the later segments.

45. The device of claim 44, further comprising means for calculating a time delta value according to:
   $\text{time\_delta} \approx \Sigma_{j=i+1}^{i+k} D(j)$, wherein $D(j)$ defines a duration of segment j, wherein i represents an estimated available segment based on a clock of a client device and k represents a number of segments between segment i and a latest segment for which the responses indicated a success.

46. The device of claim 41, wherein the plurality of probe requests comprises a second plurality of probe requests, further comprising means for sending, prior to sending the second plurality of probe requests, a first plurality of probe requests including fewer probe requests than the second plurality of probe requests, wherein the means for sending the second plurality of probe requests comprises means for sending the second plurality of probe requests after determining that responses to the first plurality of probe requests indicated failures.

47. A device for retrieving media data, the device comprising:
   means for sending a plurality of probe requests for segments of media data to a server device, wherein the server device provides the media data using a live streaming service;
   means for analyzing responses to the plurality of probe requests to determine a left edge and a right edge of a segment availability window;
   means for determining a time delta representing a difference between a time at which a segment is actually available and a time at which a clock of a client device indicates that the segment is available; and
   means for requesting one or more of the segments based on the time delta, wherein the means for requesting the one or more of the segments comprise means for sending a request for a segment on the determined left edge or the determined right edge of the segment availability window, in accordance with the live streaming service.

48. A non-transitory computer-readable storage medium having stored thereon instructions that, when executed, cause a processor to:
   send a plurality of probe requests for segments of media data to a server device, wherein the server device provides the media data using a live streaming service;
   analyze responses to the plurality of probe requests to determine a left edge and a right edge of a segment availability window;
   determine a time difference between a local clock of a client device and a clock of a server device based at least in part on the determined left edge or the determined right edge; and
   send a request for a segment within the segment availability window based at least in part on the determined time difference that is based at least in part on the determined left edge or the determined right edge, in accordance with the live streaming service.

49. The non-transitory computer-readable storage medium of claim 48, wherein the probe requests comprise one of HTTP HEAD requests and HTTP partial GET requests.

50. The non-transitory computer-readable storage medium of claim 48, wherein the instructions that cause the processor to send the plurality of probe requests comprise instructions that cause the processor to send the plurality of probe requests based on at least one of a number of HTTP 404 errors received in response to previous requests and initiation of an HTTP streaming session.

51. The non-transitory computer-readable storage medium of claim 48, wherein the instructions that cause the processor to analyze the responses comprises instructions that cause the processor to:

determine that responses to requests for earlier segments indicated failures, that responses to requests for later segments indicated failures, and that responses to requests for intermediate segments between the earlier segments and the later segments indicated successes; and based on the determination, determine that the left edge of the segment availability window is between the earlier segments and the intermediate segments and that the right edge of the segment availability window is between the intermediate segments and the later segments.

52. The non-transitory computer-readable storage medium of claim 51, further comprising instructions that cause the processor to calculate a time delta value according to:

time_delta$\approx \Sigma_{j=i+1}^{i+k} D(j)$, wherein D(j) defines a duration of segment j, wherein i represents an estimated available segment based on a clock of a client device and k represents a number of segments between segment i and a latest segment for which the responses indicated a success.

53. The non-transitory computer-readable storage medium of claim 48, wherein the plurality of probe requests comprises a second plurality of probe requests, further comprising instructions that cause the processor to, prior to sending the second plurality of probe requests, send a first plurality of probe requests including fewer probe requests than the second plurality of probe requests, wherein the instructions that cause the processor to send the second plurality of probe requests comprise instructions that cause the processor to send the second plurality of probe requests after determining that responses to the first plurality of probe requests indicated failures.

54. A non-transitory computer-readable storage medium having stored thereon instructions that, when executed, cause a processor to:

send a plurality of probe requests for segments of media data to a server device, wherein the server device provides the media data using a live streaming service;

analyze responses to the plurality of probe requests to determine a left edge and a right edge of a segment availability window;

determine a time delta representing a difference between a time at which a segment is actually available and a time at which a clock of a client device indicates that the segment is available; and request one or more of the segments based on the time delta, wherein the instructions that cause the processor to request one or more of the segments comprise instructions that cause the processor to send a request for a segment based on the determined left edge or the determined right edge of the segment availability window, in accordance with the live streaming service.

* * * * *